United States Patent
Mackman

(10) Patent No.: US 9,489,339 B2
(45) Date of Patent: Nov. 8, 2016

(54) METHOD AND SYSTEM FOR GENERATING MATERIAL REMOVER CUTTING PATHS FOR A MACHINE TOOL

(71) Applicant: Delcam Limited, Birmingham, West Midlands (GB)

(72) Inventor: Stephen William Mackman, Birmingham (GB)

(73) Assignee: Delcam Limited, Birmingham, West Midlands (GB)

( * ) Notice: Subject to any disclaimer, the term of this patent is extended or adjusted under 35 U.S.C. 154(b) by 815 days.

(21) Appl. No.: 13/712,861

(22) Filed: Dec. 12, 2012

(65) Prior Publication Data

US 2013/0151000 A1    Jun. 13, 2013

(30) Foreign Application Priority Data

Dec. 12, 2011    (GB) .................................. 1121277.6

(51) Int. Cl.
*G06F 17/00* (2006.01)
*G05B 19/4093* (2006.01)
*G05B 19/4097* (2006.01)

(52) U.S. Cl.
CPC ........... *G06F 17/00* (2013.01); *G05B 19/4093* (2013.01); *G05B 19/4097* (2013.01); *G05B 2219/35159* (2013.01); *G05B 2219/36266* (2013.01); *G05B 2219/45145* (2013.01); *Y02P 90/265* (2015.11)

(58) Field of Classification Search
None
See application file for complete search history.

(56) References Cited

U.S. PATENT DOCUMENTS 4,573,565 A * 3/1986 Braun ................... B65G 19/22
                                                 198/719
4,764,877 A * 8/1988 Tanaka ................... G05B 19/41
                                                 318/572

(Continued)

FOREIGN PATENT DOCUMENTS

GB     2374562 A     10/2002
JP     1257503 A     10/1989

OTHER PUBLICATIONS

UK Patents Act 1977: Search Report under Section 17(5) of corresponding foreign application No. GB1121277.6 dated Apr. 4, 2012; total 5 pages.

*Primary Examiner* — Robert Fennema
*Assistant Examiner* — Jay Jung
(74) *Attorney, Agent, or Firm* — Fish & Richardson P.C.

(57) ABSTRACT

A method of generating a plurality of cutting paths for a material remover, which generates a set of offsets from the perimeter of the model for each corner region of the model; creates, for each offset within each of the sets, a subset of cutting paths based upon each offset with each cutting path within the subset separated from a neighbouring cutting path within the subset by a stepover, wherein a portion of a first cutting path in one of the subsets has a distance of greater than the stepover to the last cutting path in a previous subset; joins cutting paths from within a subset at each corner region forming complete cutting paths causing a material remover to move between corner regions; and creates backfill cutting paths used to remove material from between subsets of cutting paths in the portion greater than the stepover between the subsets.

27 Claims, 16 Drawing Sheets

(56) References Cited

U.S. PATENT DOCUMENTS

| | | | | |
|---|---|---|---|---|
| 4,907,164 A * | 3/1990 | Guyder | ............... | G05B 19/41 700/173 |
| 5,845,721 A * | 12/1998 | Southard | ............... | E21B 4/006 175/106 |
| 6,428,252 B1 * | 8/2002 | Oldani | ............... | B23C 3/00 318/570 |
| 6,745,100 B1 * | 6/2004 | Lermuzeaux | ...... | G05B 19/4097 700/159 |
| 6,824,336 B2 * | 11/2004 | Izutsu | ............... | G05B 19/4166 409/132 |
| 8,763,667 B2 * | 7/2014 | De Luca | ............... | A61B 8/12 156/145 |
| 2005/0122329 A1 * | 6/2005 | Janus | ............... | G06F 13/122 345/501 |
| 2005/0188336 A1 * | 8/2005 | Mortensen | ......... | G06F 17/5081 716/106 |
| 2008/0269943 A1 * | 10/2008 | Diehl | ............... | G05B 19/40937 700/190 |

\* cited by examiner

R: tool radius (mm)
N: spindle speed (rpm)
F: feedrate (mm/min)
s: stepover (mm)
a: engagement angle (°)

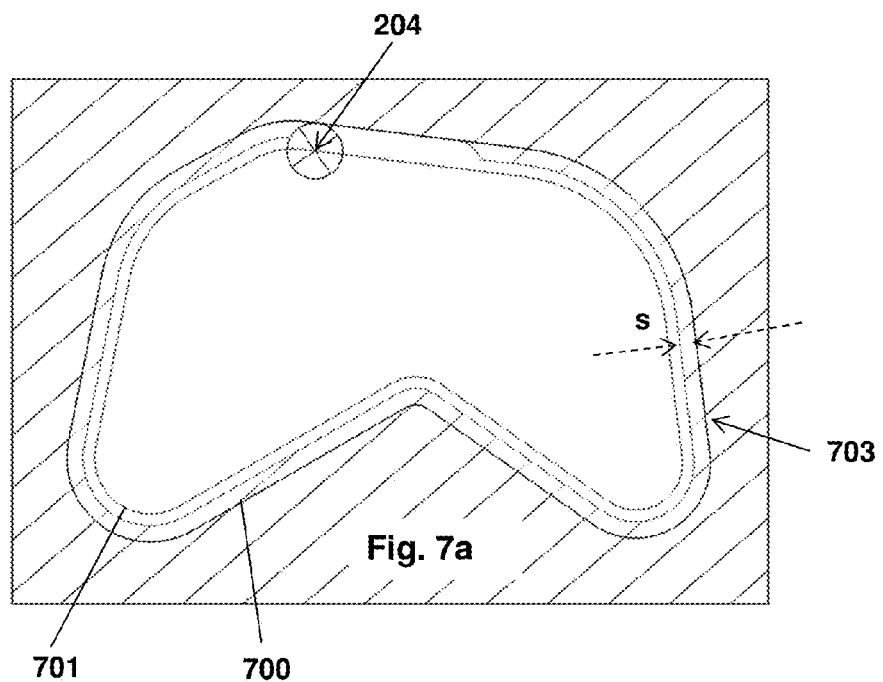

METHOD AND SYSTEM FOR GENERATING MATERIAL REMOVER CUTTING PATHS FOR A MACHINE TOOL

FIELD OF THE INVENTION

This invention relates to methods and systems for generating cutting paths. In particular, but not exclusively, the invention relates to methods of making generation of cutting paths more efficient and/or capable of being performed by machine tools.

BACKGROUND OF THE INVENTION

Computer Numerically Controlled (CNC) machines are well known. Such CNC machines typically control a material remover and include milling machines having various numbers of axes about which the material remover can be moved. In such milling machines, the material remover is a rotating element that is moved across the block of material from which a part is being manufactured.

As such, the CNC machine has, what may be referred to as, a cutting path programmed into it along which the material remover is moved. It will be appreciated that the length of time that it takes to make a part from the block of material is governed by the length of the path and the speed at which the material remover is moved along that path. Thus, the more efficiently the path can be planned then the quicker the part can be manufactured.

In particular, FIG. 1a shows details of a material remover tip 204 with various parameters marked thereon which are useful in explaining the process of linear milling as would be performed by a machine tool such as a CNC milling machine.

The cutting conditions of the material remover 204 are mostly affected by the spindle speed N, the feedrate F and the amount of material the tool is removing which is defined by the depth of cut d and the stepover s. It will be seen that stepover s is measured in a radial direction of the cutting tool whereas the depth of cut is measured in an axial direction of the cutting tool.

It is common practice to adapt these values depending on the properties of a block of material 202 being machined (nature of the material, its hardness, etc.) but also depending on the properties of the material remover 204 (tool size and shape, material it is made of, number of teeth, etc.). Tool manufacturers (ie manufacturers of the material remover 204) typically provide charts detailing the maximum safe parameter values that can be used for a specific material remover 204 when cutting a block of material 202 of a given type.

Embodiments can achieve efficient machining of a particular part by setting these values so as to remove as much material as possible in the least possible amount of time. Common sense dictates that this equates to finding a combination of the parameters outlined in relation to FIG. 1a (F, N, s and d) such that the material remover 204 is cutting as close as possible to its capabilities (often referred to as machining capabilities in the art) but never exceeds them. Exceeding the machining capabilities of a material remover 204 in a given material (from which the block of material 202 is fabricated) would result in damaging the material remover 204.

The measure of stepover s only unambiguously defines the cutting conditions when the material remover 204 is moving in a substantially straight line. Therefore another parameter traditionally used to describe cutting conditions is the tool engagement angle (a). The engagement angle is a more robust measure, when compared to the stepover s, in that it also applies when the material remover 204 follows a curved cutting path.

FIG. 1b illustrates the relationship between the tool radius R, the stepover s and the engagement angle a in linear milling. A limit for a material remover 204 traditionally used in the industry is its maximum engagement angle: for a given material being machined, manufacturers of the material remover 204 usually provide a maximum tool engagement angle beyond which safe cutting conditions are not guaranteed.

From the mathematical relationship between stepover s, tool radius R and engagement angle a it follows that, given a model to fabricate 150, there is a single path that can be followed to cut that particular profile while maintaining the tool engagement angle at its maximum acceptable value.

However, there are other limitations that need to be accounted for to efficiently machine a part using cutting paths that lie within the machine tool's 200 dynamic limitations. The skilled person will know that, as for any machine with moving parts, the speed and acceleration a given machine tool 200 are limited by the characteristics of that machine tool 200.

Running a machine tool 200 too close to its physical limitations is not generally wanted either as it can cause it to wear out more quickly in addition to having other side effects such as excessive noise or vibrations detrimental to the working environment.

SUMMARY OF THE INVENTION

According to a first aspect of the invention there is provided a method of generating a plurality of cutting paths for a material remover of a machine tool arranged to have a stepover between cutting paths which when executed cause at least a portion of an article to be manufactured, the method comprising at least one of the following:

a) assessing a model of the article to be manufactured and generating a plurality of offsets from the perimeter of the article to be manufactured;

b) creating, for each of the offsets, a subset of cutting paths based upon that offset with each cutting path within the subset separated from a neighbouring cutting path within the subset by substantially the stepover, wherein at least a portion of a first cutting path in one of the subsets may have a distance of greater than the stepover to the last cutting path in a previous subset and wherein the method may determine whether the number of cutting paths within a subset should be varied around the or each cutting path and if the determination is positive varies the number of cutting paths within a subset; and c) creating backfill cutting paths that are used to remove the material from between subsets of cutting paths in the portion that was greater than the stepover between the subsets.

Such a method is advantageous since it may allow the material remover of a machine tool subsequently used to machine the article to be moved at a substantially constant feedrate whilst allowing cutting path length to be reduced, if not minimised, and also helps to ensure that the engagement of the material remover does not exceed a predetermined value (specified by nominal stepover in a straight line or by an angle of engagement). Typically, corners of a model cause problems for the material removers of a machine tool in that there is often problem material left adjacent the corner which is often not efficiently removed. As such, a further advantage of embodiments of the invention is that it processes this problem material more efficiently by removing it progressively between the subsets of cutting paths.

Thus, embodiments of the invention may vary the number of cutting paths within a subset around the paths. In turn, the number of backfill passes used between subsets of cutting paths may be varied around the paths.

Generally, the stepover is measured in a radial direction of the cutting tool.

Steps a and b of the method may be performed in an iterative manner. That is an offset, perhaps referred to as an initial offset, may be created together with an associated subset of cutting paths before a further offset is created.

The method may provide a user with a model generator which allows him/her to create the model of the article to be manufactured.

The method may be arranged to process 3D models. In particular, the method could work on non-planar 2D surfaces. In such embodiments the method could be applied on 2-manifold mathematical surfaces such as implicit surfaces (eg cylinders, cones) or parametric surfaces (eg NURBS).

The method may provide an offset generator arranged to generate the offsets.

Conveniently, the method is arranged to set a minimum cutting radius which sets the radius of curvature below which the material remover cannot follow a cutting path reliably.

Some embodiments of the invention may set an initial offset at a predetermined distance from the perimeter of the model of the article to be manufactured. In particular, this initial offset may be a predetermined multiple of the stepover distance.

Additionally, the initial offset may also include a multiple of a predetermined minimum cutting radius.

The method may perform a double offset, in which an offset is performed in a first direction from a perimeter of the model before a further offset is performed in a second direction, typically opposite the first. Such double offsets are advantageous because it ensures that any material remover that follows a path generated by the method is not caused to try and cut below the minimum cutting radius. Thus, in some of the embodiments described above, the initial and further offsets are created in a first direction from the perimeter of the model and the cutting paths are created, by offsetting, in the second direction from the initial and further offset.

The method may generate a predetermined number of cutting paths within a subset. A cutting path generator may be provided to generate the cutting paths.

In alternative, or additional, embodiments the method may vary the number of cutting paths within a subset. In some embodiments, the number of cutting paths within a subset may be varied according to an angle of a corner of the model.

The method may use a calculation to determine the number of cutting paths within a subset. Alternatively, the method may use a set of empirical rules to determine the number of cutting paths per sub set.

The backfill cutting paths may be of a variety of different forms. The backfill cutting paths may for example be trochoidal, Bezier curves, circular, ellipses or the like.

According to a second aspect of the invention there is provided a method of fabricating an article, the method comprising generating a plurality of cutting paths for a material remover of a machine tool arranged to have a stepover between cutting paths and the method further comprising at least one of the following:

a) assessing a model of the article to be manufactured and generating a plurality of offsets from the perimeter of the article to be manufactured;

b) creating, for each of the offsets, a subset of cutting paths based upon one of the offsets with each cutting path within the subset separated from a neighbouring cutting path by substantially the stepover, wherein at least a portion of a first cutting path in one of the subsets may have a distance of greater than the stepover to the last cutting path in a previous subset and wherein the method may determine whether the number of cutting paths within a subset should be varied around the or each cutting path and if the determination is positive varies the number of cutting paths within a subset;

c) creating any backfill cutting paths that are required in order to remove the material from between subsets of cutting paths in the portion that was greater than the stepover between the subsets; and d) fabricating the article by causing a material remover of a machine tool to follow the cutting path generated in steps a to c.

According to a third aspect of the invention there is provided a processing apparatus comprising processing circuitry arranged to do at least one of the following:

a) assess a model of the article to be manufactured and generating a plurality of offsets from the perimeter of the article to be manufactured;

b) create, for each of the offsets, a subset of cutting paths based upon that offset with each cutting path within the subset separated from a neighbouring cutting path by substantially the stepover, wherein at least a portion of a first cutting path in one of the subsets may have a distance of greater than the stepover to a last cutting path in a previous subset and wherein the method may determine whether the number of cutting paths within a subset should be varied around the or each cutting path and if the determination is positive varies the number of cutting paths within a subset; and c) create backfill cutting paths that are required in order to remove the material from between subsets of cutting paths in the portion that was greater than the stepover between the subsets.

According to a fourth aspect of the invention there is provided a machine-tool comprising processing circuitry, wherein the processing circuitry is arranged to:

a) assess a model of the article to be manufactured and generating a plurality of offsets from the perimeter of the article to be manufactured;

b) create, for each of the offsets, a subset of cutting paths based upon one of the offsets with each cutting path within the subset separated from a neighbouring cutting path by substantially the stepover, wherein at least a portion of a first cutting path in one of the subsets may have a distance of greater than the stepover to the last cutting path in a previous subset and wherein the method may determine whether the number of cutting paths within a subset should be varied around the or each cutting path and if the determination is positive varies the number of cutting paths within a subset;

c) creating any backfill cutting paths that are required in order to remove the material from between subsets of cutting paths in the portion that was greater than the stepover between the subsets;

d) fabricate the article by causing a material remover of the machine tool to follow the cutting paths generated in steps a to c.

According to a fifth aspect of the invention there is provided a machine readable medium containing instructions which when read by a machine cause that machine to:

perform the method of the first or second aspects of the invention;

perform as the processing apparatus of the third aspect of the invention; or perform as the machine tool of the fourth aspect of the invention.

According to a sixth aspect of the invention there is provided a method of generating a plurality of cutting paths for a material remover of a machine tool which when executed cause at least a portion of an article to be manufactured, the method comprising at least one of the following:

a) assessing curved portions of a current cutting path to be machined to determine whether the angle of engagement between the material remover and the material to be machined is above a predetermined angle as the material remover passes around the current cutting path; and b) if the angle of engagement is predicted to fall above the predetermined angle then increasing the radius of a corresponding curved portion of a preceding cutting path such that the angle of engagement of the current cutting path remains below the predetermined angle.

Embodiments providing such an aspect of the invention are believed advantageous because they allow the feedrate of the material remover to be kept at a higher speed than otherwise would be the case without overloading the material remover and/or machine tool. As such, the chance of damage to the material remover and/or machine tool is reduced whilst improving the quality of the machining that is performed. It is possible to view the angle of engagement of the material remover as a function of the shape of the work-piece and the skilled person will appreciate that the shape of the work piece is a function of the previous cutting path. As such, controlling the shape of the previous cutting path may be used to control the current angle of engagement.

The method may repeat steps a and b, replacing the current path in step a with the previous path in each iteration such that the preceding path ($n-1^{th}$) being assessed in step b becomes the path preceding the preceding path ($n-2^{th}$) of the previous iteration. As such, embodiments of the invention may start processing the plurality of cutting paths with the last one to be executed and work toward the first one to be executed. Such an arrangement is convenient since latter paths are planned upon material which is present and as such to determine what material the current path is processing a determination of what material the previous path has left in place is made.

Conveniently, the method may increase the radius of curvature of portions of the preceding cutting path if is determined that the angle of engagement falls above the predetermined angle.

The method may ensure that each of the cutting paths is tangent continuous. That is, the method may obtain the tangent (ie the first derivative) of the curve of the cutting path and determine whether that is continuous for that cutting path. Such a step is convenient because it can help to ensure that a machine tool can perform that cutting path.

Some embodiments of the method may be arranged to insert further portions of a cutting path to ensure that the cutting path is tangent continuous. These further portions of a cutting path may be inserted if it is determined that the curve is not tangent continuous. In some embodiments, the further portions of the cutting path may be tangents to a curved portion of the cutting path. In other embodiments, the further portions may themselves be curved portions.

According to a seventh aspect of the invention there is provided a method of fabricating an article, the method comprising generating a plurality of cutting paths for a material remover of a machine tool and the method further comprising at least one of the following:

a) assessing curved portions of a current cutting path to be machined to determine whether the angle of engagement between the material remover and the material to be machined is above a predetermined angle as the material remover passes around the current cutting path;

b) if the angle of engagement is predicted to fall above the predetermined angle then increasing the radius of a corresponding curved portion of a preceding cutting path such that the angle of engagement of the current cutting path remains below the predetermined angle; and c) causing a material remover of a machine tool to follow the cutting paths to fabricate the article.

According to an eighth aspect of the invention there is provided a processing apparatus comprising processing circuitry arranged to perform at least one of the following:

a) assess curved portions of a plurality of cutting paths to be machined to determine whether the angle of engagement between a material remover of machine tool performing the cutting paths and the material to be machined is above a predetermined angle as the material remover passes around a current cutting path; and b) if the angle of engagement is predicted to fall above the predetermined angle then the processing circuitry being arranged to increase the radius of a corresponding curved portion of a preceding cutting path such that the angle of engagement of the current cutting path remains below the predetermined angle.

According to a ninth aspect of the invention there is provided a machine-tool comprising processing circuitry, wherein the processing circuitry is arranged to perform at least one of the following:

a) assess curved portions of a plurality of cutting paths to be machined to determine whether the angle of engagement between a material remover of machine tool performing the cutting paths and the material to be machined is above a predetermined angle as the material remover passes around a current cutting path; and b) if the angle of engagement is predicted to fall above the predetermined angle then the processing circuitry being arranged to increase the radius of a corresponding curved portion of a preceding cutting path such that the angle of engagement of the current cutting path remains below the predetermined angle.

According to a tenth aspect of the invention there is provided a machine readable medium containing instructions which when read by a machine cause that machine to:

perform the method of the sixth and seventh aspects of the invention;

perform as the processing apparatus of the eighth aspect of the invention; or perform as the machine tool of the ninth aspect of the invention.

The machine readable medium of any of the aspects of the invention may comprise any one or more of the following: a floppy disk, a CDROM, a DVD ROM/RAM (including +RW, −RW), an HD DVD, a BLU Ray disc, a hard drive, a non-volatile memory, any form of magneto optical disk, a wire, a transmitted signal (which may comprise an internet download, an ftp transfer, or the like), or any other form of computer readable medium.

According to a eleventh aspect of the invention there is provided an object produced by the method of any of the above aspects of the invention.

The skilled person will appreciate that a feature described in relation to any of the above aspects of the invention may be applied, mutatis mutandis, to any of the other aspects of the invention.

BRIEF DESCRIPTION OF THE DRAWINGS

There now follows, by way of example only, a description of embodiments of the present invention of which:

FIG. 1b illustrates further parameters associated with the material remover of FIG. 1a;

FIG. 7a illustrates features of an internal pocket to be machined in relation to a material remover;

DETAILED DESCRIPTION

Figure 2:
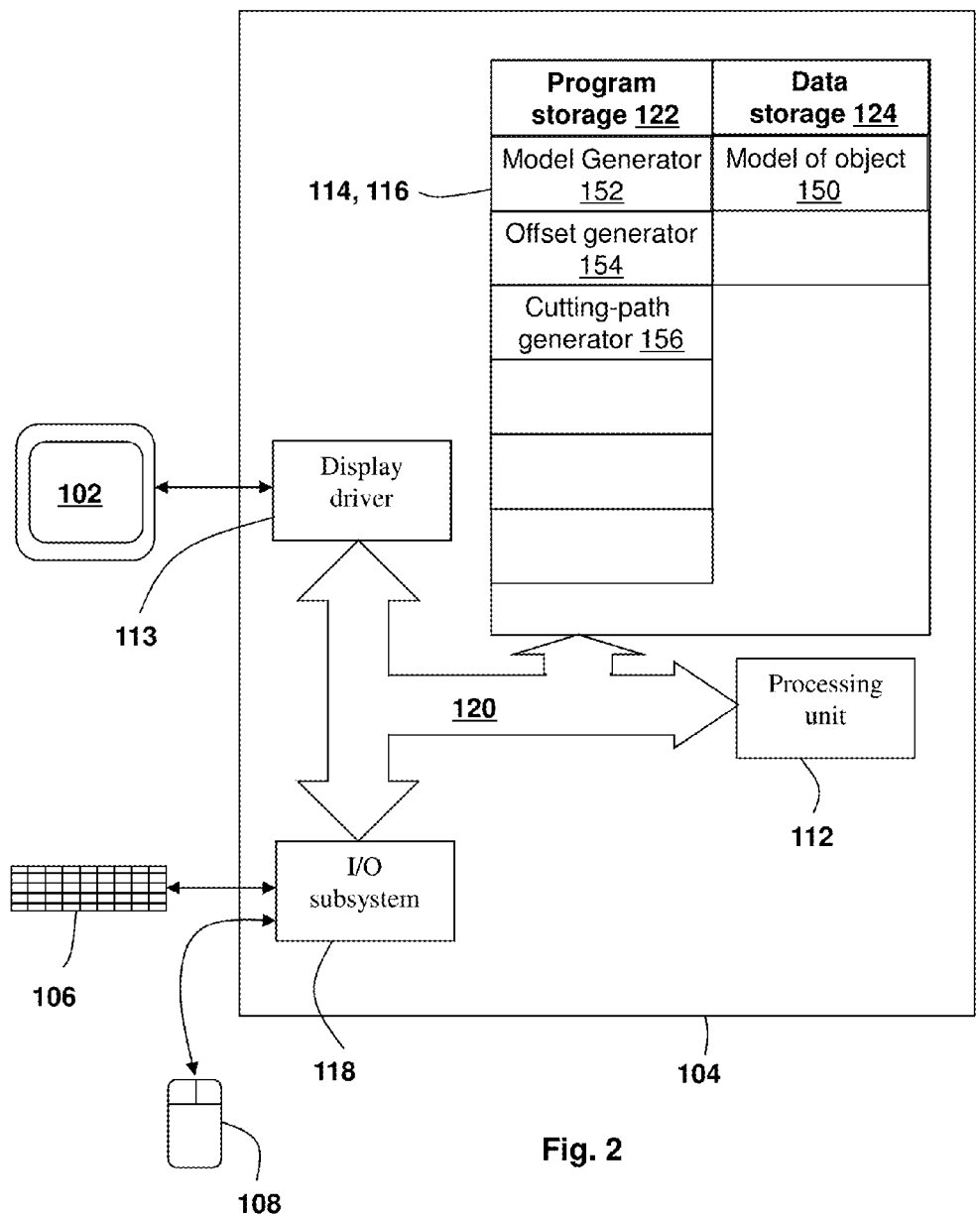
FIG. 2 schematically shows the memory of a processing unit arranged to provide an embodiment of the invention.

The computer system of FIG. 2 comprises a display 102, processing circuitry 104, a keyboard 106 and a mouse 108. The processing circuitry 104 comprises a processing unit 112, a graphics system 113, a hard drive 114, a memory 116, an I/O subsystem 118 and a system bus 120. The processing unit 112, graphics system 113 hard drive 114, memory 116 and I/O subsystem 118 communicate with each other via the system bus 120, which in this embodiment is a PCI bus, in a manner well known in the art.

The graphics system 113 comprises a dedicated graphics processor arranged to perform some of the processing of the data that it is desired to display on the display 102. Such graphics systems 113 are well known and increase the performance of the computer system by removing some of the processing required to generate a display from the processing unit 112.

It will be appreciated that although reference is made to a memory 116 it is possible that the memory could be provided by a variety of devices. For example, the memory may be provided by a cache memory, a RAM memory, a local mass storage device such as the hard disk 114, any of these connected to the processing circuitry 104 over a network connection. However, the processing unit 112 can access the memory via the system bus 120 to access program code to instruct it what steps to perform and also to access data to be processed. The processing unit 112 is arranged to process the data as outlined by the program code.

A schematic diagram of the memory 114,116 of the computer system is shown in FIG. 2. It can be seen that the memory comprises a program storage portion 122 dedicated to program storage and a data storage portion 124 dedicated to holding data.

The program storage portion 122 comprises a model generator 152 which is used, by a user, to generate a model of an object 150 to be fabricated. In the embodiment being described the model generator 152 is provided by CAM (Computer Aided Manufacture) software such as the PowerMILL™ package provided by the applicant although other packages are equally possible.

Figure 1A:
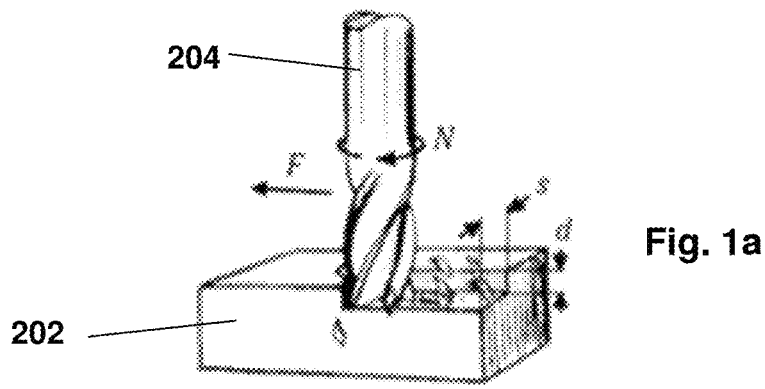
FIG. 1a schematically illustrates a material remover of a machine tool highlighting various parameters.
Figure 3:
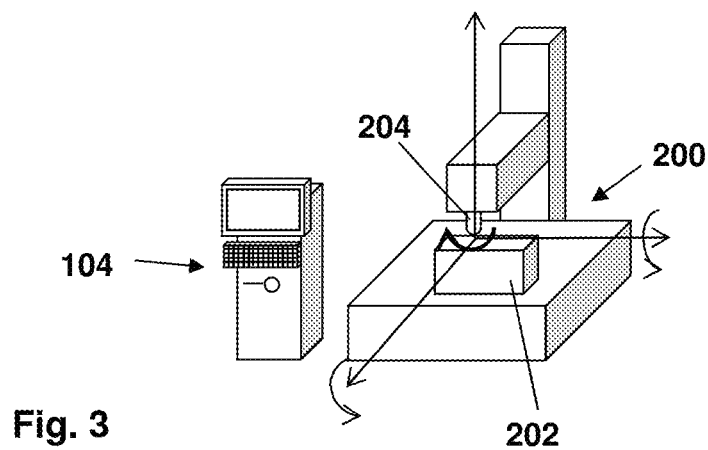
FIG. 3 shows a machine tool according to an embodiment of the invention.

The program storage portion 122 may comprise portions of code which provide:

an offset generator 154 arranged to determine an offset from a point, or series of points, etc. on the model to the object to be fabricated 150, or a cutting path, etc.; and a cutting path generator 156 arranged to generate cutting paths;

In one embodiment of the invention, there is provided a CNC milling machine 200 (an example of a machine tool)

as shown in FIG. 3 which is used to fabricate the model to be fabricated 150 from a block of material 202; that is it is arranged to create a part which is represented by the model to be fabricated 150 from the block of material 202. A material remover 204 removes material from the block 202 and is controlled by processing circuitry 104. As described above in relation to FIG. 1a, the material remover 204 removes an material to a depth of cut d and to a stepover s laterally into the block of material 202. Both the depth of cut d and stepover s give the material removal capacity for the material remover 204 in a single cutting path (ie pass thereof).

In other embodiments, the CNC milling machine 200 may be controlled by a separate processing circuitry which receives data from the processing circuitry 104. In yet further embodiments, the machine may be a machine other than a milling machine.

Thus, the processing circuitry 104 is arranged to control the material remover 204 to follow a cutting path which causes the material remover 204 to move relative to the block of material 202 thereby causing an article represented by the model, or at least a portion thereof, to be manufactured.

Figure 1B:
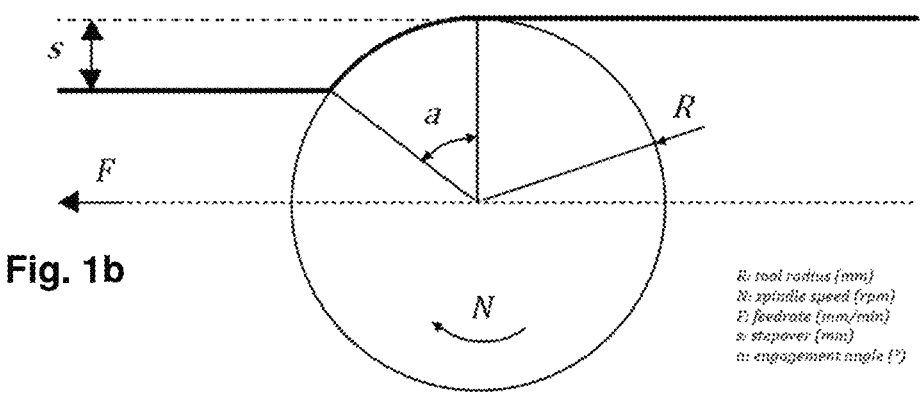

Referring back to FIG. 1b, it will be appreciated that the following relationship holds for straight-line cutting:

$$\cos(a_0) = \frac{R - s_0}{R} \tag{B1}$$

Figure 4:
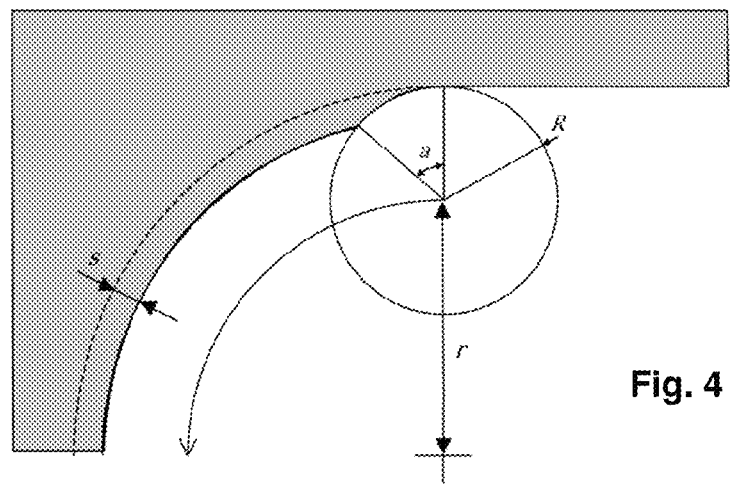
FIG. 4 illustrates how the engagement angle is calculated as a material remover moves around a curved cutting path.

However, as the material remover 204 moves around a curved cutting path, the equation to calculate the material remover engagement angle (eg the cutter engagement angle) a becomes more complex, and referring to FIG. 4, the following equation can be derived:

$$\cos(a) = \frac{s^2 + 2 \cdot r \cdot R - 2 \cdot r \cdot s - 2 \cdot R \cdot s}{2 \cdot r \cdot R} \tag{B2}$$

For completeness, equation B2 can be derived as follows (which uses notation highlighted on FIG.5):

$$\cos(a) = \frac{d}{R} \tag{1}$$

$$R^2 = d^2 + h^2 \tag{2}$$

$$(r + R - s)^2 = (r + d)^2 + h^2 \tag{3}$$

$$(3) - (2) \Rightarrow (r + R - s)^2 = \tag{4}$$

$$(r + d)^2 - d^2 \Rightarrow d = \frac{s^2 + 2 \cdot r \cdot R - 2 \cdot r \cdot s - 2 \cdot R \cdot s}{2 \cdot r}$$

$$(1) \text{ with } (4) \Rightarrow \cos(a) = \frac{s^2 + 2 \cdot r \cdot R - 2 \cdot r \cdot s - 2 \cdot R \cdot s}{2 \cdot r \cdot R}$$

Some embodiments of the invention try to maintain the same tool engagement around a curved cutting path as would be the case when cutting along a substantially straight cutting path. As such, equations B1 and B2 can be rearranged to express the stepover s for cutting a curve in terms of the straight-line stepover $s_0$:

$$(B2) = (B1) \Rightarrow \frac{s^2 + 2 \cdot r \cdot R - 2 \cdot r \cdot s - 2 \cdot R \cdot s}{2 \cdot r \cdot R} =$$

$$\frac{R - s_0}{R} \Rightarrow s^2 - 2 \cdot (r + R) \cdot s + 2 \cdot r \cdot s_0 = 0$$

The second degree equation can be solved as follows:

$$a \cdot s^2 + b \cdot s + c = 0$$

with:

$$a = 1$$

$$b = -2 \cdot (r + R)$$

$$c = 2 \cdot r \cdot s_0$$

we then have:

$$\Delta = b^2 - 4 \cdot a \cdot c \Rightarrow \Delta = 4 \cdot (r + R)^2 - 8 \cdot r \cdot s_0$$

possible solutions are:

$$s_1 = \frac{-b + \sqrt{\Delta}}{2 \cdot a}$$

$$s_2 = \frac{-b - \sqrt{\Delta}}{2 \cdot a}$$

Solution $s_1$ should be excluded as it may give a result greater than the tool diameter and as such the acceptable solution is:

$$s = \frac{2 \cdot (r + R) - \sqrt{4 \cdot (r + R)^2 - 8 \cdot r \cdot s_0}}{2} \tag{B3}$$

$$s = r + R - \sqrt{(r + R)^2 - 2 \cdot r \cdot s_0}$$

Embodiments of the invention can use equation B3 to calculate the radius of successive cutting paths in order to maintain the stepover s as desired. The above equations determine the stepover from a circular segment. Other embodiments may use different determinations for segments which are not circular or may use one or more circular approximations to the non-circular segment.

Figure 6:
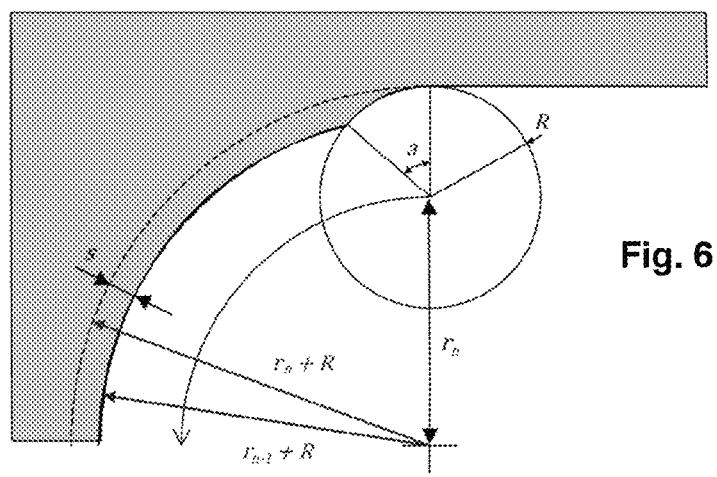
FIG. 6 illustrates how radii of successive cutting paths may be calculated.

Thus, looking at FIG.6, it can be seen that the radius $r_{n-1}$ can be determined for a given arc of radius $r_n$.

$$s = (r_n + R) - (r_{n-1} + R) = r_n - r_{n-1}$$

then equation (B3) becomes: $r_n - r_{n-1} = r_n + R - \sqrt{(r_n + R)^2 - 2 \cdot r_n \cdot s_0}$ And it follows that radius $r_{n-1}$ can be calculated using the formula:

$$r_{n-1} = \sqrt{(r_n + R)^2 - 2 \cdot r_n \cdot s_0} \tag{B4}$$

Figure 5:
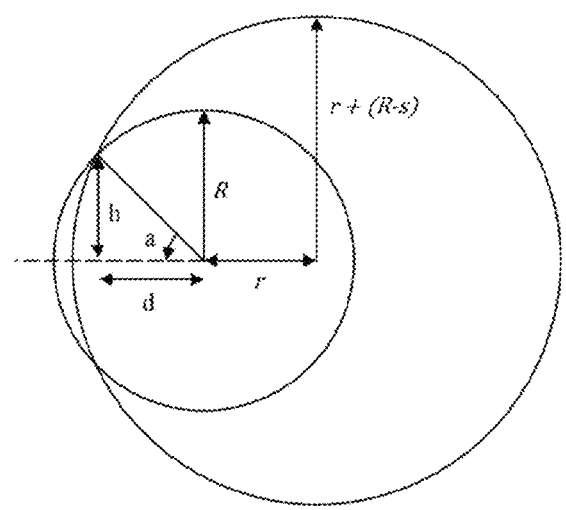
FIG. 5 provides a further illustration of aspects of FIG. 4.

Thus, and using the method of determining radii illustrated in FIGS. 4 to 6, it is possible for embodiments of the invention to determine a series of cutting paths as, discussed with reference to FIGS. 7 to 19.

FIG. 7a illustrates that to machine an internal pocket 700, a material remover 204 is moved around an $n^{th}$ cutting path 701 which removes, in the straight regions (eg 703) of the $n^{th}$ cutting path 701 material of up to a width of the stepover s.

Figure 7B:
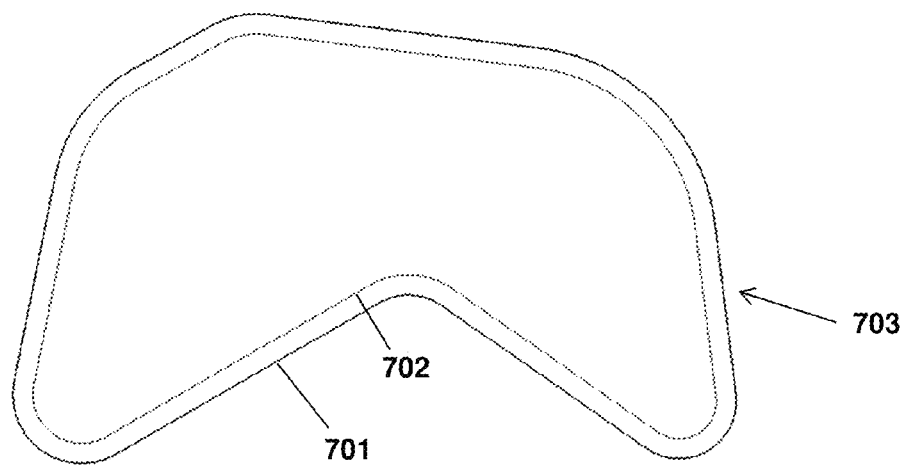
FIG. 7b illustrates a first stage in a method of determining a series of cutting paths.

Turning to FIG. 7b, the first step of the method is, starting from the outermost profile of the internal pocket 700 to create the $n^{th}$ cutting path 701, and offset it inwards to the stepover s to create the n-$1^{th}$ cutting path 702 which can be referred to as the proto-cutting path.

Figure 8:
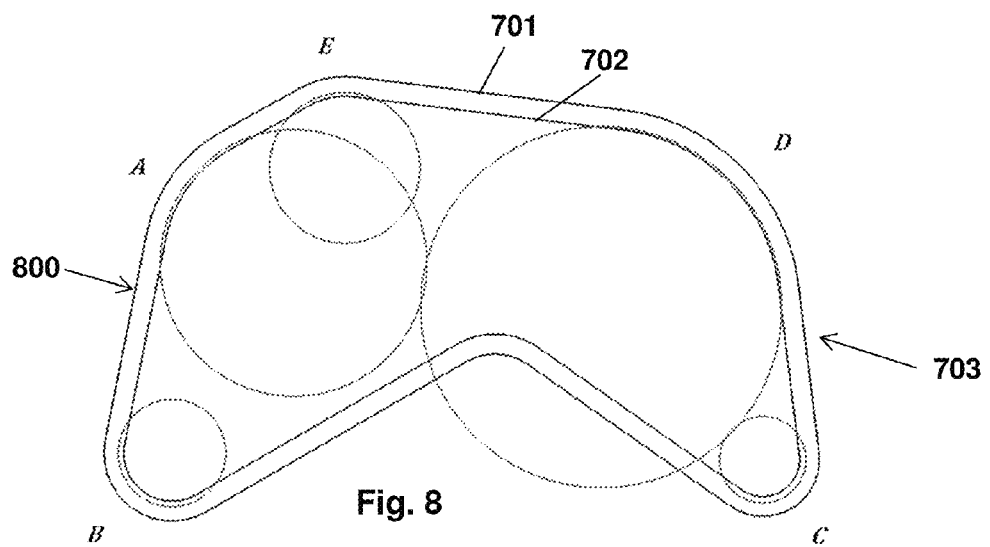
FIG. 8 shows a second stage in the method.

The second step, illustrated with reference to FIG. 8, is to calculate for each corner (A, B, C, D and E) the radii required on the $n-1^{th}$ curve 702 in order to maintain the same tool engagement (a) on the $n^{th}$ curve 701 as the material remover 204 moves around that corner (A to E) of the cutting path that it experiences moving along the substantially straight portions of the cutting path; eg at 800 and the equation B4 is used to make this determination. Thus, an assessment is made for the curved portions of the cutting path and it is determined whether the angle of engagement has varied from the value it would have on a straight portion of the cutting path where the value along a straight portion of the path may therefore be considered a predetermined angle.

In the example/embodiment being described, the value of R (the radius of the material remover 204) is set to 12 mm and the value of the stepover is taken to be 7 mm Since the radii of the perimeter of the internal pocket 700 are known (values are given as $r_n$ in the following table), the values of $r_{n-1}$ can be determined:

| A: | $r_n = 53$ | ⇒ | $r_{n-1} = 47.1$ |
|---|---|---|---|
| B: | $r_n = 24$ | ⇒ | $r_{n-1} = 19.0$ |
| C: | $r_n = 20$ | ⇒ | $r_{n-1} = 15.3$ |
| D: | $r_n = 70$ | ⇒ | $r_{n-1} = 63.8$ |
| E: | $r_n = 32$ | ⇒ | $r_{n-1} = 26.6$ |

Circles having these radii are marked on FIG. 8. In this embodiment, these circles, A to E are centred such that they are concentric with the curved portions of the $n-1^{th}$ curve and it will be seen that in order to maintain a constant angle of engagement the stepover (s) is reduced within the corners (A to E) and the smaller the radius of a corner (ie a curved portion), the greater the reduction in the stepover s compared to the substantially straight portion 800. As such, the radius of curved portions of the cutting path, on the $n-1^{th}$ curve 702, are increased in order to maintain the angle of engagement at or below the predetermined angle on the $n^{th}$ curve 701 (ie at the engagement angle along a straight portion 703 of the cutting path). Thus, if the angle of engagement is predicted to fall above the predetermined angle the radius of a corresponding curved portion of a preceding cutting path $(n-1^{th})$ is increased such that the angle of engagement of the current cutting path $(n^{th})$ remains below the predetermined angle.

Figure 9:
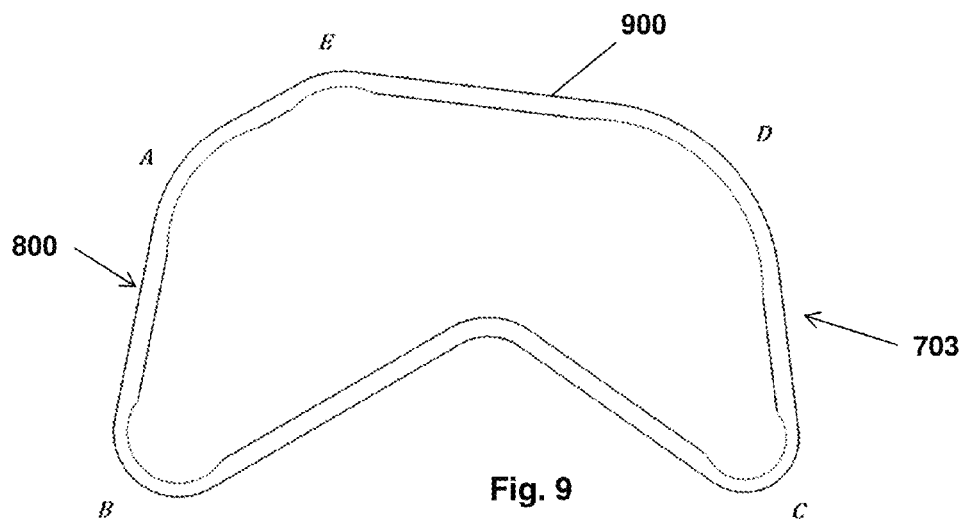
FIG. 9 shows a third stage in the method.

Once the circles per corner A-E have been determined then the method merges the perimeters of the A to E with the proto-cutting path 702 (ie the $n-1^{th}$ path) determined in the first step of the method and the resultant merged cutting path 900 is shown in FIG. 9. It will be seen that the merged cutting path 900 comprises the straight portions 800 intersected with the circles A to E.

Once the $n^{th}$ path has been processed then the method repeats such that it is the $n-1^{th}$ which is considered as the current cutting path and the $n-2^{th}$ cutting path is considered as the preceding cutting path. This process continues until the method considers each of the cutting paths used to machine the pocket 700 or the method breaks down as described in relation to FIG. 15.

Figure 10:
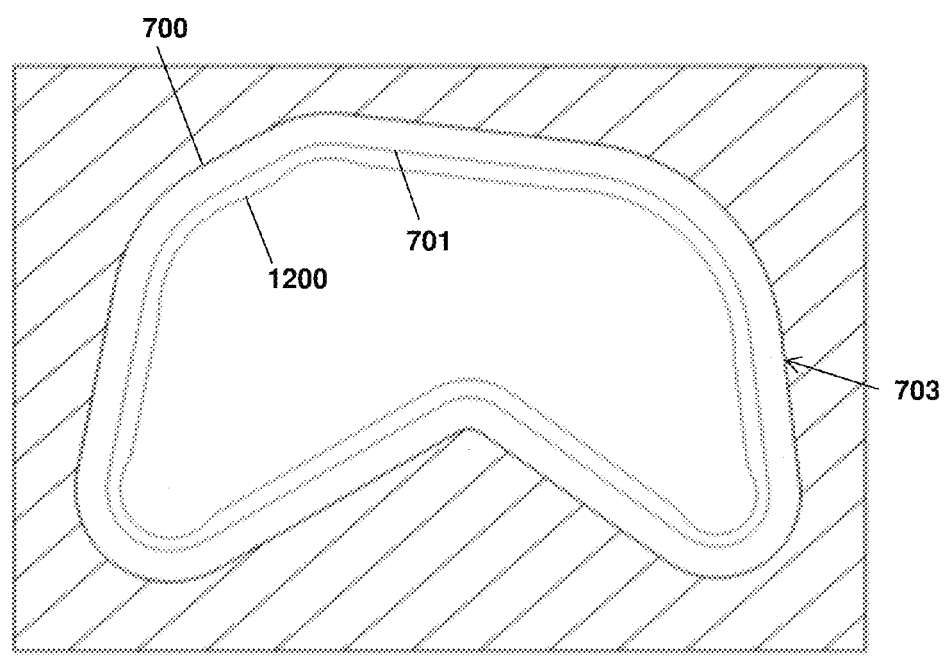
FIG. 10 shows a resultant cutting path superimposed on the first stage of the method as shown in FIG. 7b.

Some embodiments of the invention may further process the merged cutting path 900 in order to help ensure that the cutting path is tangent continuous which is typically processed better by machine tools 200. This may be thought of as a fourth step of the method and helps to ensure that junctions between the circles A to E are smoothly merged into the proto cutting path 702 (ie the $n-1^{th}$ path). The skilled person will appreciate that discontinuities between the two will make it difficult for machine tools 200 to follow. FIG. 10 illustrates a smoothed path, 1200.

In some circumstances, the circles generated in the second stage of the method as described in relation to FIG. 8, can intersect with one another outside of the proto-cutting path 702 ie the $n-1^{th}$ path (or in the case of an external feature, as opposed to an internal pocket/feature as described in relation to the current figures, inside of the proto-cutting path). This is illustrated in FIG. 11, where circles A and E intersect each other at 1300 and it can be seen that this is outside the proto-cutting path 702.

Figure 11:
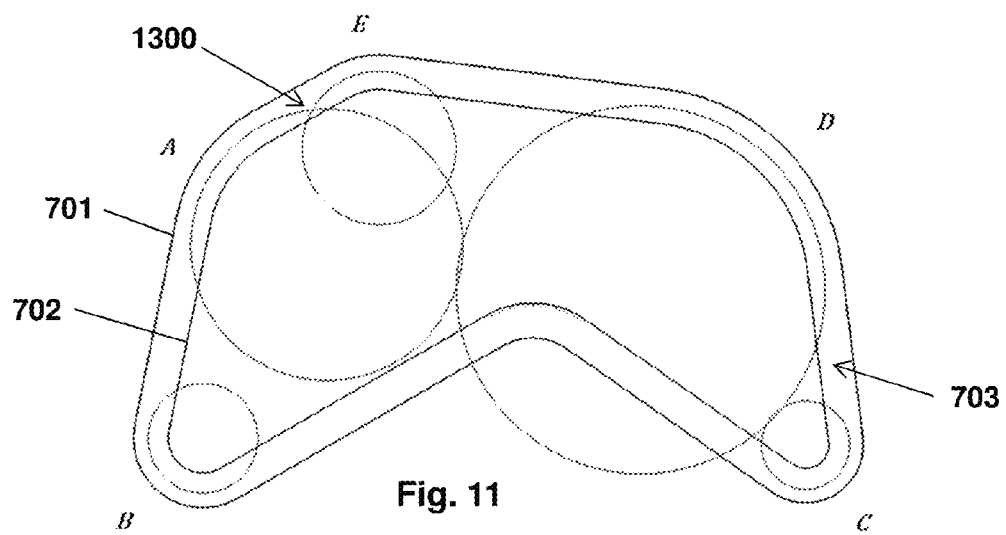
FIG. 11 highlights a potential conflict that may occur in the second stage of the method as shown in FIG. 8.
Figure 12:
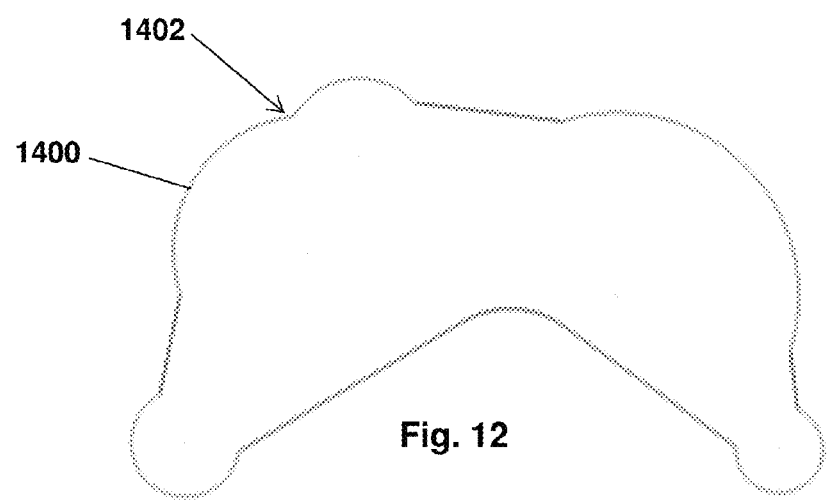
FIG. 12 illustrates a modified cutting path that might be generated from the situation described in relation to FIG. 11.

Embodiments of the invention may be arranged to modify the creation of the modified cutting path in order to take into account the situation shown in FIG. 11. FIG. 12 shows the resultant modified cutting path 1400 that would result if the circles A to E and straight portions of the proto-cutting path 702 of FIG. 11 are merged and it can be seen that there is a sudden change in direction at point 1402 which would be difficult, if not impossible, to machine correctly; ie to allow a material remover 204 to be driven along the modified cutting path 1400 would not be as convenient as desired.

Figure 13:
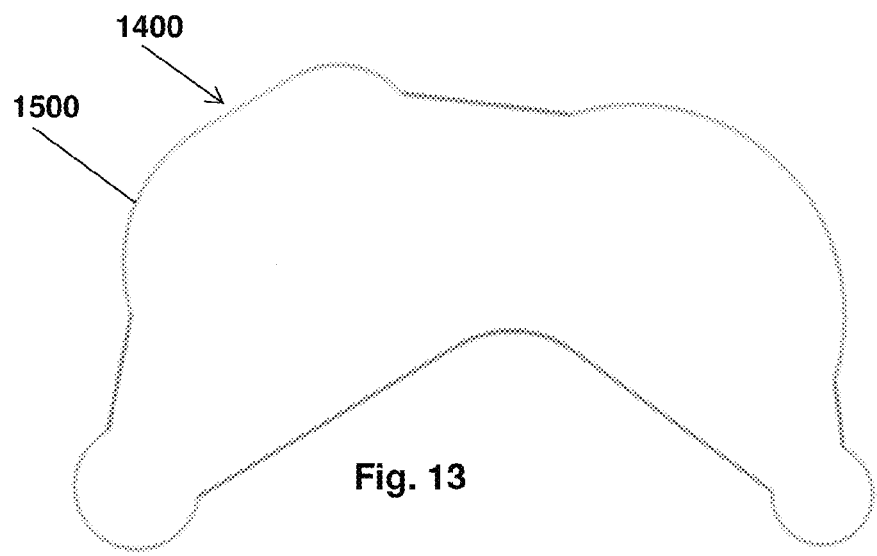
FIG. 13 illustrates a method of mitigating the problem highlighted in FIG. 12.

The discontinuities can be smoothed as previously described. However, other embodiments of the invention may employ other techniques, one of which is illustrated with the aid of FIG. 13. In this embodiment, a tangent to each of the circles A and E is placed therebetween and the modified cutting path 1500 of FIG. 13 is therefore created. It can be seen that the sharp change in direction at point 1400 has been removed.

Figure 14:
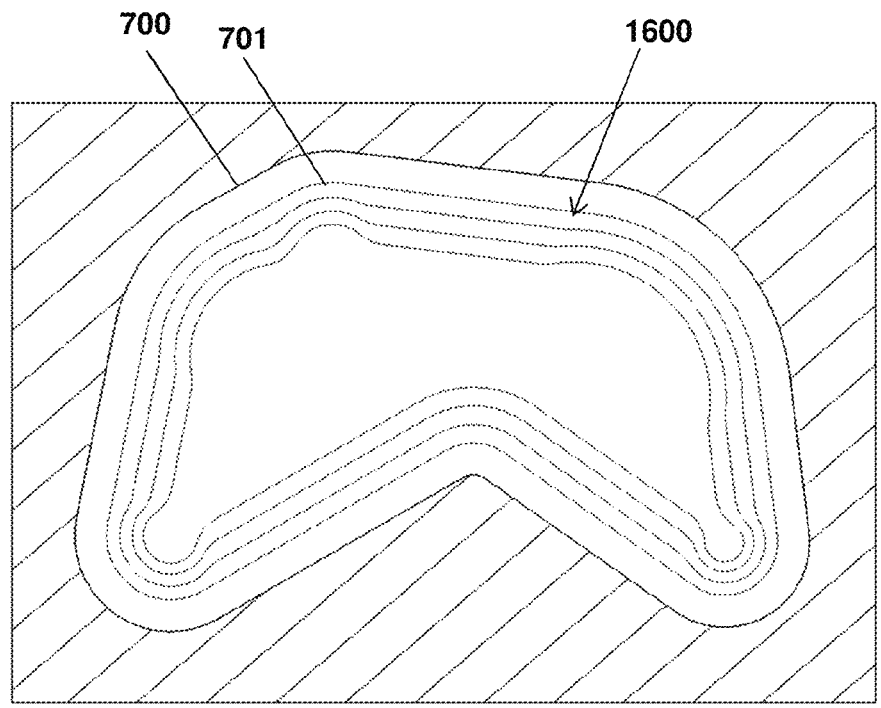
FIG. 14 illustrates a series of cutting paths generated by the methods described in relation to FIGS. 7 to 13.
Figure 15:
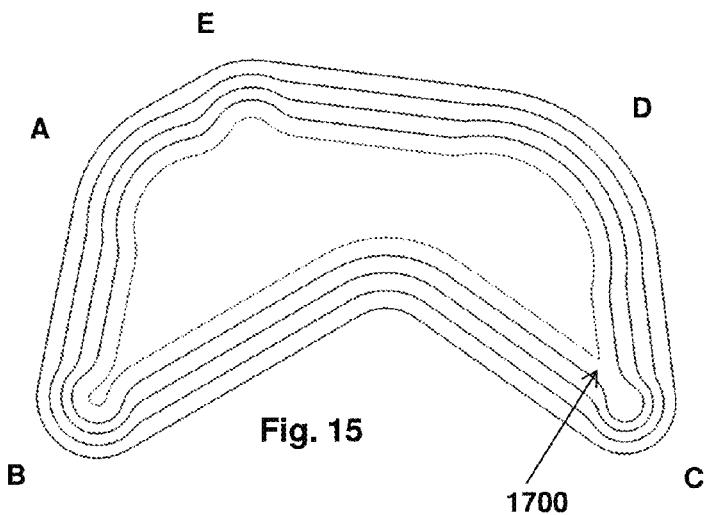
FIG. 15 illustrates a limitation of the method outlined in relation to some embodiments of the method illustrated in relation to FIGS. 7 to 16.

The method described in relation to FIGS. 7 to 15 can be used to generate a set of cutting paths that can be used to clear out the internal pocket 700 whilst keeping material remover engagement angle (which may be referred to as the cutter engagement angle) substantially constant. FIG. 14 illustrates a set of cutting paths 1600 which may be thought of as a subset of cutting paths. However, as illustrated in FIG. 15, the method can break down as illustrated in relation to corner C thereof. In particular, it will be seen that in the region of corner C, the method outlined so far has generated a sharp change of direction at point 1700.

The description in relation to FIGS. 7 to 15 above describe embodiments of a method that aims to maintain the angle of engagement a of the material remover 204 at a substantially constant amount. However, it was seen that in certain conditions the embodiments described above can fail and as such additional or alternative embodiments may employ the method described in relation to FIGS. 16 to 28 which provide a further strategy for providing cutting paths for the material remover 204. The strategies described in relation to FIGS. 16 to 28 try to achieve at least one of the following:

i) aim to maintain the feed rate of the material remover 204 at a predetermined, perhaps maximum, value;
ii) ensure that the stepover (s) does not exceed a maximum value; and
iii) minimises the path length.

As such, it will be seen that the embodiments being described herein no longer try to keep the angle of engagement a of the material remover 204 at a constant value.

Thus, embodiments that achieve points i) and ii) whilst minimising iii) should machine a part as quickly/efficiently as possible.

FIG. 16 shows a piece of material 2000 (which could for example be the block of material 202) into which an internal pocket is to be machined and which has an $n^{th}$ cutting path 2002. The method of this embodiment is also described in relation to FIG. 28. Before any of processing to determine a cutting path can be performed then the model of the part must be created 3300 and assessed. As the skilled person will appreciate, the model will typically be a three dimensional model and as such it is processed, as is known in the art, to create two dimensional perimeter as shown in the Figures.

Figure 16A:
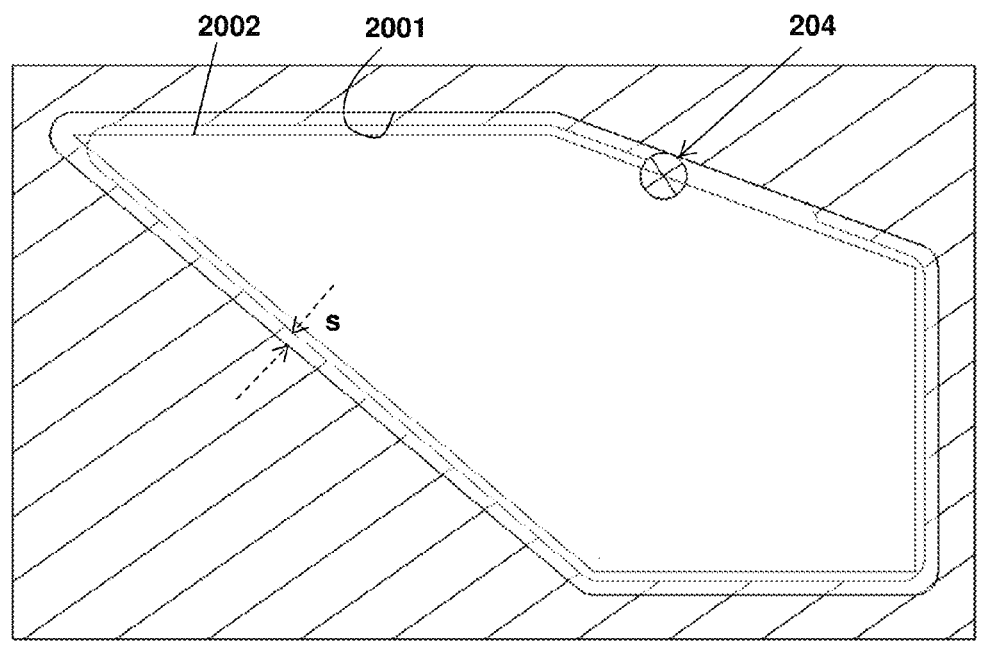
FIG. 16a illustrates features of a further internal pocket to be machined in relation to a material remover.

FIG. 16a shows a material remover 204 machining an internal pocket 2001 by moving along an $n^{th}$ cutting path 2002. Again, the material remover 204 removes material to a width of the stepover s in straight regions of the cutting path 2002.

It will be seen that in the embodiment being described, the internal pocket 2001 comprises five internal corners including one substantially 90° corner. The skilled person will appreciate that a rotary material remover, such as the material remover 204, cannot cut squares as shown in the Figure but the method described in relation to FIGS. 16 to 28 takes this into account and generates a cutting path for the material remover 204 which aims to meet points i) to iii) above.

For the following method a stepover (s) and minimum radius of curvature ($r_{min}$) are set and used to calculate the cutting path for the material remover 204. Each of the minimum cutting radius $r_{min}$ and stepover s may be set according to a variety of factors including: the machine tool 200 being utilised, the nature of the block of material 202, the material remover 204, and the like.

The method generates a cutting tool path for the material remover 204; ie a path along which the material remover 204 is moved in order to machine the desired shape (ie the part) from the block of material 202. In the embodiment being described, the cutting tool path comprises a series of paths around the block of material 202 which comprises a plurality of subsets of cutting paths, in which each pass of the material remover 204 around the block of material 202 is separated from the next by a predetermined stepover (ie s). Between each subset, the amount of material to be removed can differ from s (ie is too great an amount to be removed in a single pass of the material remover 204) in some regions along the cutting tool path.

Thus, the final cutting path that is generated comprises what may be thought of as a series of subsets of offsets interleaved with backfill cutting paths which are used to remove the material which cannot be removed in a single pass from between the subsets of cutting paths. The skilled person will appreciate that such backfill moves are not efficient and as such there is a desire to use as few as possible of these.

The backfill moves may take various forms and in the embodiment being described are circular paths. However, in other embodiments the backfill moves may be trochoidal paths, Bezier curves, ellipses, circles or the like.

Figure 16B:
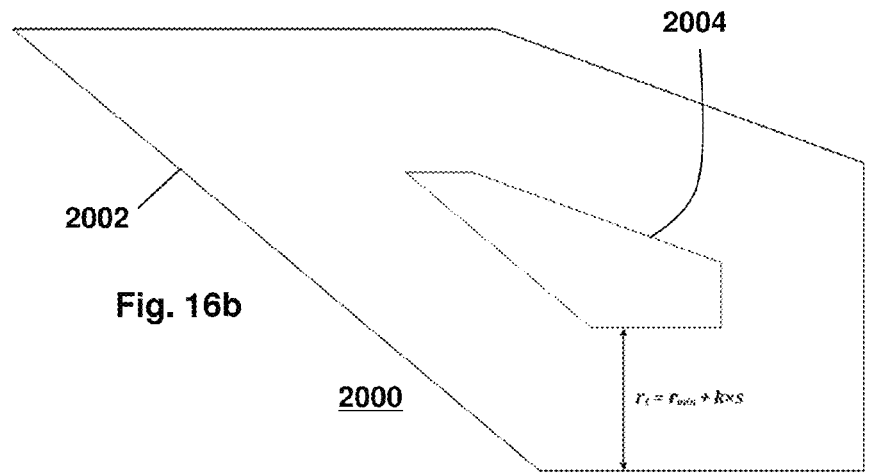
FIG. 16b shows the first stage in a second embodiment of the method in which an initial offset is generated.

A first stage of this method, as shown in FIG. 16b, is the generation of an initial offset 2004, step 3304. In the embodiment being described, the initial offset 2004 is an interior offset, since an internal pocket 2001 is being machined. However, the method can also be applied, with the necessary changes, to external shapes.

The initial offset 2004 is created by offsetting the $n^{th}$ cutting path 2002 inwards by a radius $r_1=r_{min}+k\times s$, where k is an integer greater than zero and may be termed a predetermined multiple of the stepover distance. This radius $r_1$ may be thought of as being a predetermined distance from the perimeter.

Figure 17:
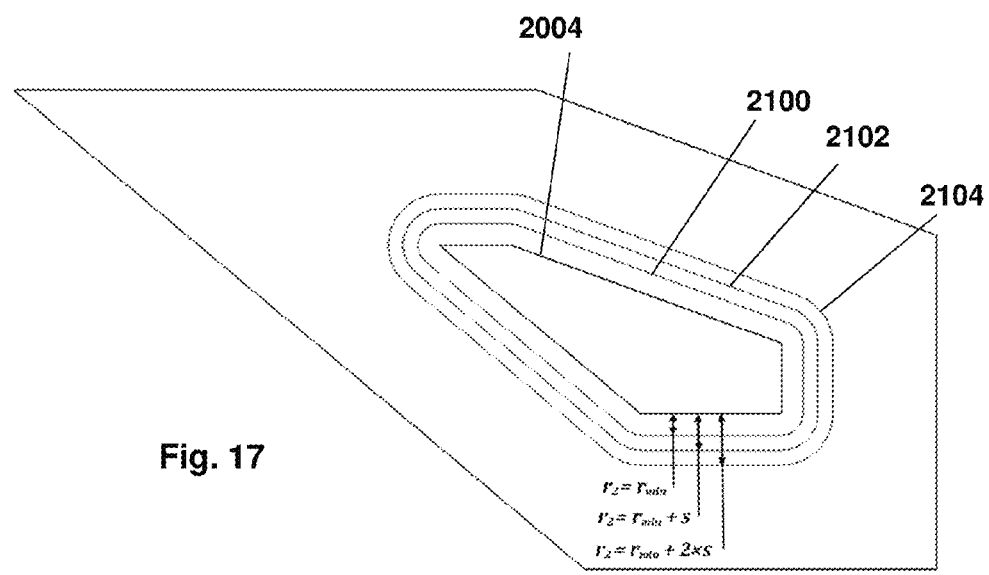
FIG. 17 shows a further step in which cutting paths are generated from the initial offset.

Once the initial offset has been created, as described in relation to FIG. 16b, then cutting paths within a subset of cutting paths are generated as shown in FIG. 17 and step 3306. As such, it will be seen that each cutting path within a subset is separated from its neighbouring cutting path in the subset by substantially the stepover for the length of the cutting path. The first cutting path 2100 is positioned outward from the initial offset 2004 by an amount $r_{min}$. A second cutting path 2102 within the subset is created as distance s from the first cutting path 2100 and in the embodiment being described, a third cutting path 2104 is created at distance s from the second cutting path 2102 (ie at 2×s from the first cutting path 2100. As will be described later there may be fewer or more cutting paths within each subset of cutting paths. However, the cutting paths within a subset are positioned from the initial offset 2004 by $r_{min}$ plus a multiple of the minimum cutting radius: $r_n=+(n-1)\times s$. Other embodiments may generate the cutting paths within the subset in any order without affecting the final result.

A skilled person will appreciate how to generate the cutting paths 2100,2102,2104, which are seen to have rounded corners, from the square initial offset 2004. However, for the avoidance of doubt one method that can be used to generate such a cutting path is to trace the outer perimeter of a disc as that disc is rotated around the square shape of the initial offset 2004.

Thus, it will be seen that the cutting paths within a subset are, what may be termed, a double offset; they are produced by offset in a first direction (in this case inwards from the $n^{th}$ cutting path 2002) and then by offsetting in a second direction opposite from the first (in this outwards towards the $n^{th}$ cutting path 2002). Embodiments which use such a double offset have the advantage that the cutting paths have no sharp corners.

Figure 18:
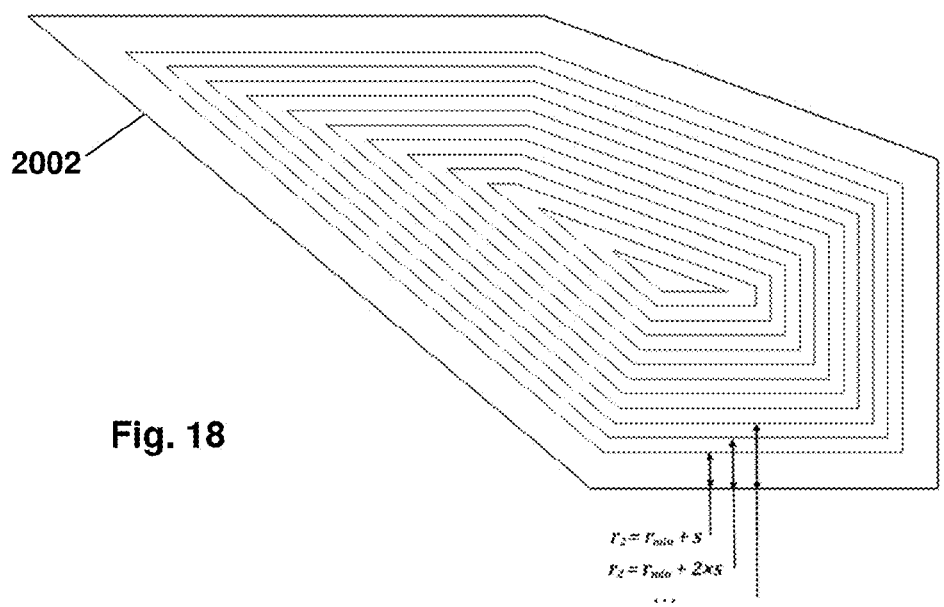
FIG. 18 shows a set of potential initial offsets.

Returning to the creation of the initial offset 2004, then FIG. 18 shows, for the $n^{th}$ cutting path 2002, the entire set of possible initial offset; each being separated by the stepover distance s that has been set for the embodiment.

Figure 19:
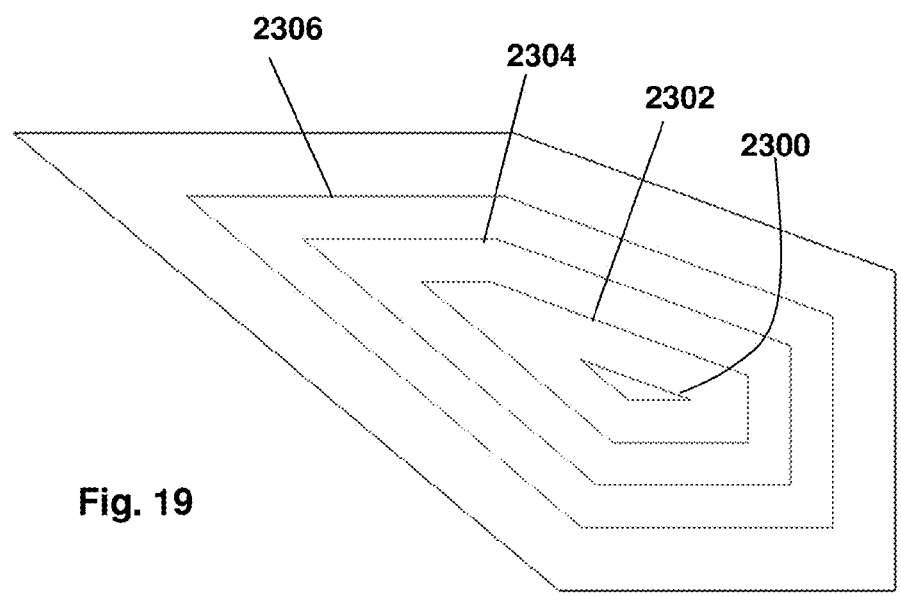
FIG. 19 shows an initial offset together with a plurality of further offsets that have been selected from the set shown in FIG. 18.
Figure 20:
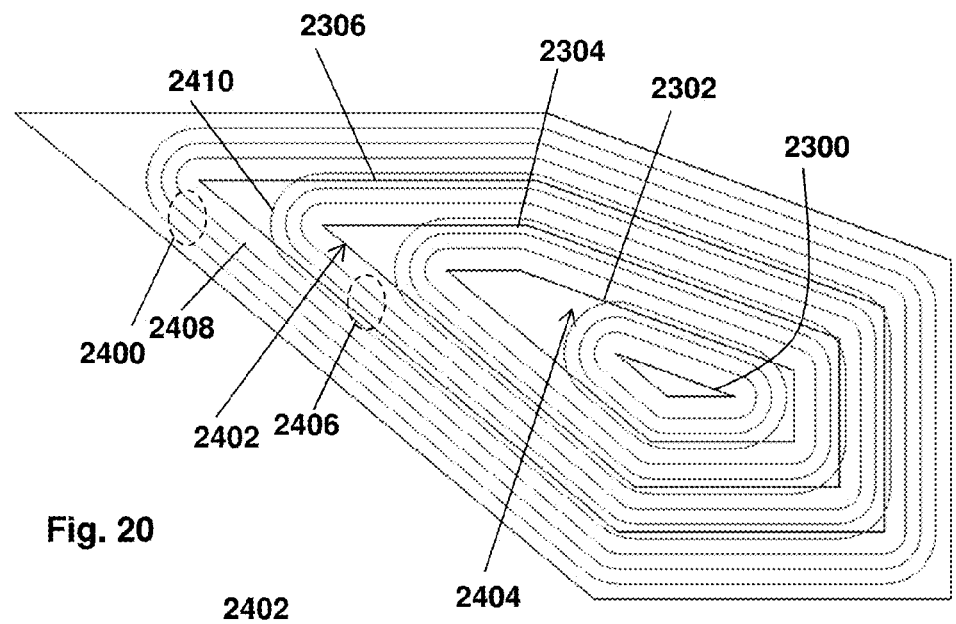
FIG. 20 shows a plurality of subsets of cutting paths that have been generated from the initial and further offsets shown in FIG. 19.

In some embodiments, the number of cutting paths in a subset of cutting curves is initially selected and set to a predetermined value; ie there are a predetermined number of cutting paths in a subset. In the embodiment being described then the number of cutting paths per subset has been set at 3; ie n=3. Setting n=3 results in the selection of the initial offset 2300 together with the further offsets 2302, 2304, 2306 all as shown in FIG. 19. Thus, the embodiment generates a plurality of offsets from the perimeter.

With n set to 3 as in the embodiment being described then the offsets, as shown in FIG. 19, are at distances $r_1=r_{min}+s$; $r_1=r_{min}+n\times s$; $r_1=+2\times n\times s$, etc.

Once the initial offset 2300 and the further offsets 2302-2306 have been generated then a subset of cutting paths is generated starting from either the initial offset 2300 or the further offsets 2302-2306. It will be seen that in this embodiment that because the number of cutting paths per subset was set at three (ie n=3) there are three cutting paths per subset; for example see subset 2400 in FIG. 20. As such, the model now creates a subset of cutting paths for each offset that has been previously generated.

However, it will be seen that between the subsets of cutting paths (eg at 2402, 2404) there are regions where the gap between neighbouring cutting paths in neighbouring subsets are greater than the stepover s. As such, should the material remover 204 be made to simply follow the paths shown in FIG. 20 then islands of material may remain.

A further example of a subset of cutting paths is highlighted at 2406. It will be appreciated that each cutting path within a subset is separated from each other cutting path (ie each neighbouring cutting path) in the subset by the stepover s for the length of the cutting path. However, to exemplify that gap can be larger than the stepover along at least a portion of the cutting paths length it can be seen that a first cutting path of one subset will be separated from the last cutting path of a neighbouring subset by a distance greater than the stepover. Looking at FIG. 20, it can be seen that the first cutting path 2408 within subset 2400 has regions that are greater than the stepover s from the last cutting path 2410 in the subset 2406. This increase in distance happens in, for example, the regions 2402, 2404 and will also typically occur in a region of the cutting path adjacent to a corner.

It will also be noted that in this embodiment, the method generates a set of offsets 2300, 2302, 2304, 2306, which although constant around the model are generated for each corner region of the model. Cutting paths created for each of the corner regions are subsequently joined to form the cutting paths, eg 2408.

Figure 21:
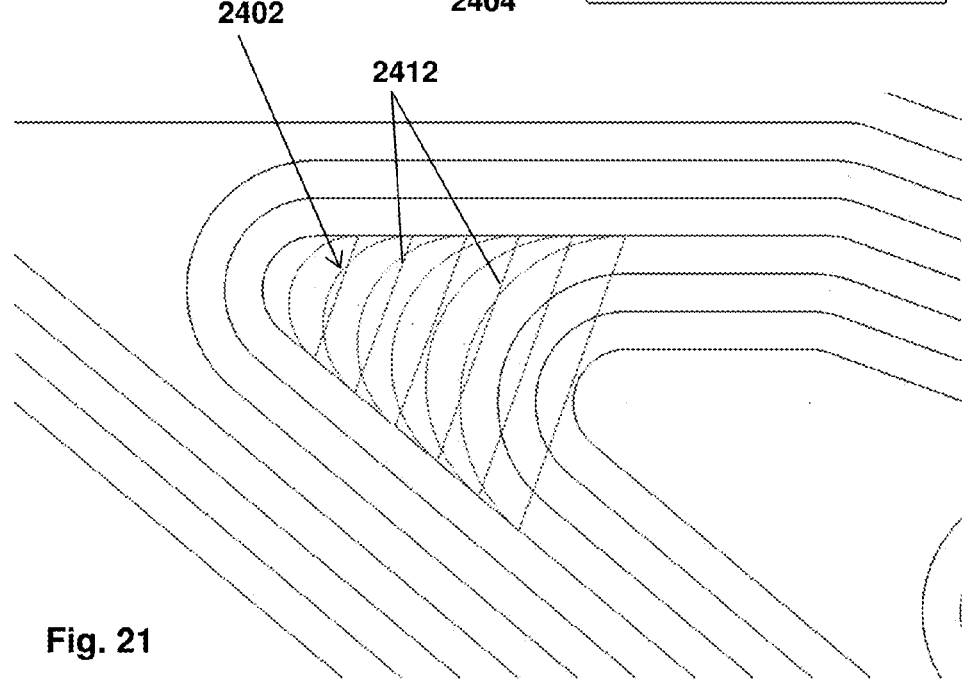
FIG. 21 shows a set of backfill cutting paths that may be used with the cutting paths of FIG. 20.

Thus, looking at FIG. 21, a series of backfill cutting paths are determined for each of the islands (eg 2402, 2404)—step 3308. The backfill cutting paths are arranged to remove material from between the subsets of cutting paths that would not be machined should the material remover simply follow the cutting paths of the subsets. Indeed, FIG. 21 shows how circular backfill paths are used to fill the island 2402 of FIG. 20. Whilst this embodiment shows the use of circular backfill paths, the skilled person will appreciate that other back fill shapes are equally possible. For example, other embodiments may use trochoidal curves, ellipses, Bezier curves or the like. Indeed, whilst the portions of the backfill cutting paths that remove material are a circular nature the return path may be arranged to be as short as possible in order to save time in moving the material remover. In the backfill cutting paths exemplified in FIG. 21, it can be seen that the non-cutting portions thereof are shown as straight lines; see for example 2412. Generally, embodiments of the invention will ensure that backfill cutting paths will be tangent continuous with other cutting paths in order to help ensure that any machine tool 200 will be capable of executing the cutting path as generated. Tangent continuity will typically apply to both cutting and non-cutting portions of the backfill path.

Figure 22:
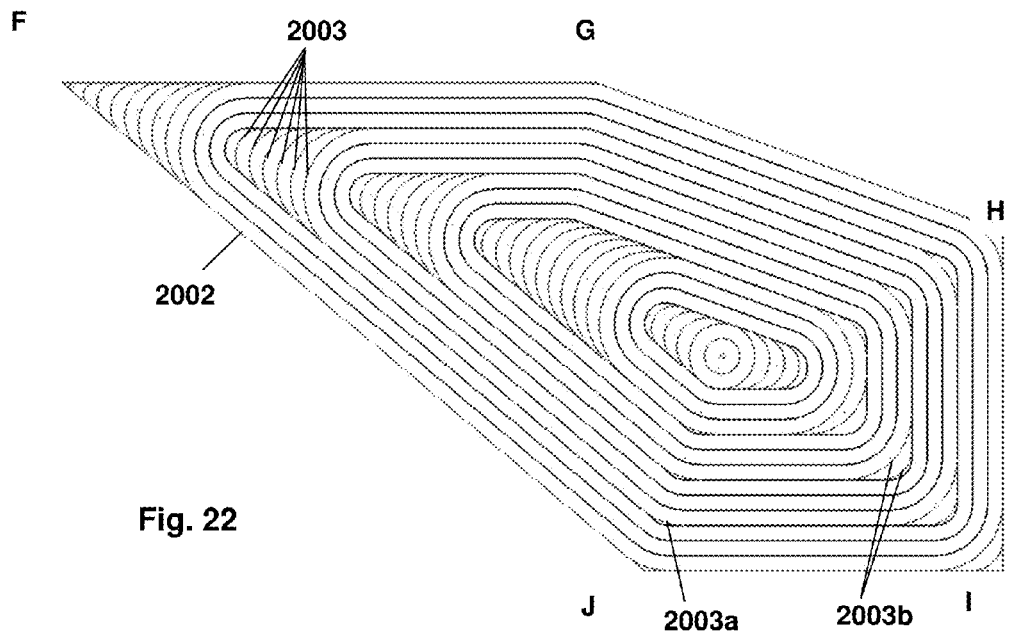
FIG. 22 shows a set of cutting paths in which backfill cutting paths have been added between the subsets of cutting paths.

FIG. 22 shows the $n^{th}$ cutting path 2002 in which cutting paths, including backfill cutting paths, are shown and which clear the internal pocket formed by the $n^{th}$ cutting path 2002. For the sake of clarity, the back of the backfill passes (ie the non cutting portions thereof) are not shown in FIG. 22 but the backfill passes are shown in full in FIG. 21.

It should also be noted that the number of backfill passes used to clear material from between subsets of cutting paths varies around the cutting paths. For example, in the region of corner F it can be seen that six backfill cutting paths 2003 are used to clear the material between subsets (which themselves comprise three cutting paths). In the region of corner J, a single backfill cutting path 2003a is inserted between subsets of cutting paths (which themselves comprise three cutting paths). In the region of corner I, two backfill cutting paths 2003b are inserted between subsets of cutting paths (which themselves comprise three cutting paths).

Thus, the embodiment described in relation to FIG. 22 varies the number of cutting paths per subset according to the angle of a corner adjacent that region of the cutting paths. The embodiment also varies the number of backfill paths used between subsets of cutting paths.

Once the set of cutting paths have been generated then a data file may be created 3310 arranged to drive a machine tool 200. A final step 3312, it is of course possible to drive the machine tool 200 to produce the part by causing the material remover 204 to follow the cutting paths that have been generated.

FIGS. 16b to 22 describe a method in which an arbitrary number of cutting paths per subset is decided and in the embodiment described, this number was set to three (ie n=3). Such embodiments are perhaps computationally simple to implement, quicker to process, etc., but the selection of the number of cutting paths per subset may not be optimal in some corner regions. Selection of a sub-optimal number of cutting paths, in some embodiments, can lead to inefficient use of backfill passes in that the material remover 204 may remove less material than it could leading to longer cutting times. Secondly, sharp convex corners (ie those less than 90°; perhaps less than 75°; perhaps less than 50°) may need an un-necessarily large number of backfill passes which can lead to longer return moves at the back of these and again can lead to an increase in machining time since the material remover 204 is not cutting material on these back moves.

As such, some embodiments of the invention may locally optimise the number of cutting paths per subset in the region of different corners of the $n^{th}$ cutting path 2002.

Figure 23:
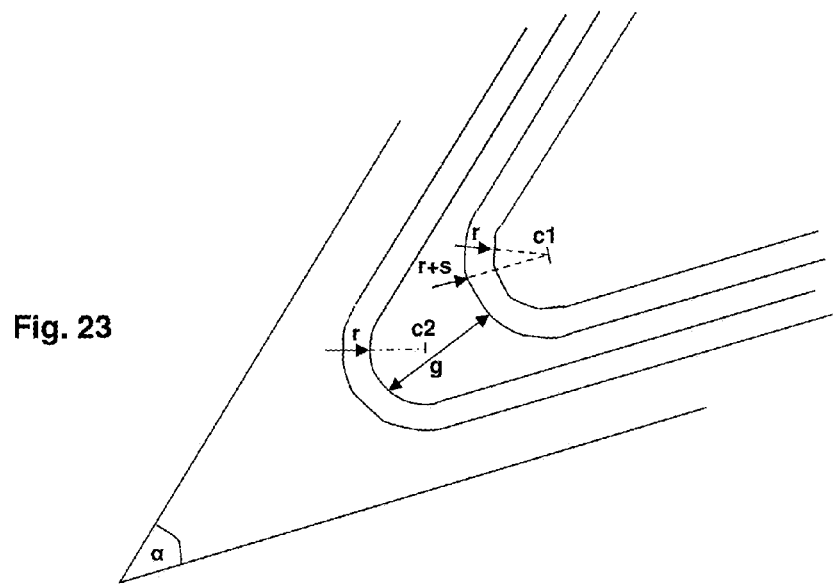
FIG. 23 illustrates a method of determining the number of cutting paths per subset.

Looking at FIG. 23, then for a given corner having an angle a it is possible to determine the number of cutting paths that should be provided in a given subset of paths and therefore it is also possible to determine the gap (g) between subsets.

The gap (g) between subsets can be expressed as a function of the angle α and the number of paths in a subset as follows:

$$g = d(c1,c2) + r - (r + (n-1) \times s)$$

with: n=the number of consecutive paths in a subset of paths;
α=the angle formed by the profile to be machined;
s=the stepover as described above; and
r=the minimum radius as described above.

The distance between points C1 and C2 is given as follows:

$$d(c1, c2) = \frac{n \times s}{\sin\left(\frac{\alpha}{2}\right)}$$

Combining these two equations it then follows that:

$$g = \frac{n \times s}{\sin\left(\frac{\alpha}{2}\right)} - n \times s + s$$

Extracting the function k:

$$k_\alpha = (n) = \left(\frac{1}{\sin\left(\frac{\alpha}{2}\right)} - 1\right) \times n$$

This can be re-arranged to give g:

$$g = k_\alpha(n) \times s + s$$

In order to fill the gap g it is desired to use m backfill cutting paths such that the maximum space between consecutive backfill cutting paths does not exceed the stepover s, so that the number of backfill cutting paths is given by:

$$m = \left\lceil \frac{g-s}{s} \right\rceil = \lceil k_\alpha(n) \rceil$$

where the notation [x] represents the ceiling function (ie the smallest integer not less than x).

And the remainder of the gap once m backfill cutting paths have been inserted is naturally:

$$\delta = g - m \times s = (\lceil k_\alpha(n) \rceil - k_\alpha(n))$$

In order to generate as efficient a toolpath as possible, the remainder should be as close as possible to the nominal stepover s. So in a given corner forming an angle α, the method finds the best possible number of consecutive segments n in a series so as to minimize the following function:

$$F_\alpha(n) = \lceil k_\alpha(n) \rceil - k_\alpha(n)$$

To provide some examples:
For α=120° $k_{120}(n)=0.15 \times n$
for n=6 we have $k_{120}(6)=0.90$ and $f_{120}=0.10$ which gives 1 backfill cutting path to insert every 6 segments.
For α=90° $k_{90}(n)=0.41 \times n$
for n=2 we have $k_{90}(2)=0.82$ and $f_{90}=0.18$ which gives 1 backfill cutting path to insert every 2 segments.
alternatively there is the solution
for n=4 we have $k_{90}(4)=1.64$ and $f_{90}=0.36$ which gives 2 backfill cutting path to insert every 4 segments
or a further alternative
for n=7 we have $k_{90}(7)=2.87$ and $f_{90}(7)=0.13$ which gives us 3 backfill cutting path to insert every 7 segments.
α=30° $k_{30}(n)=2.91 \times n$
for n=1 we have $k_{30}(1)=2.91$ and $f_{30}(1)=0.09$ which gives us 3 backfill cutting path to insert every single segment.

In other embodiments, the gap g, as illustrated in FIG. 23, may not be specifically determined since it can be computationally intensive and in any case the value is likely to vary as curvature may change around a turn further adding to the complexity of the calculation. As such, a number of empirical factors may be used to determine how many cutting paths should be presented within a subset:

when the size of the gap g (eg 2402, 2404) becomes larger than a defined length or area threshold;
when the gap g is such that more than a defined maximum number of backfill cutting paths will need inserting;
when a defined maximum number of cutting paths have already been generated in the current subset;
when the end of the current corner region is reached;
when the start of the next corner region is reached;
when the profile curve is reached;
or the like.

As was described in relation to FIG. 23 the tighter a corner (ie the less the angle of the corner) then the fewer the number of cutting paths that can be maintained within a subset. An embodiment is now described in relation to the $n^{th}$ cutting path 2002 and a set of empirical rules as previously discussed.

Figure 24:
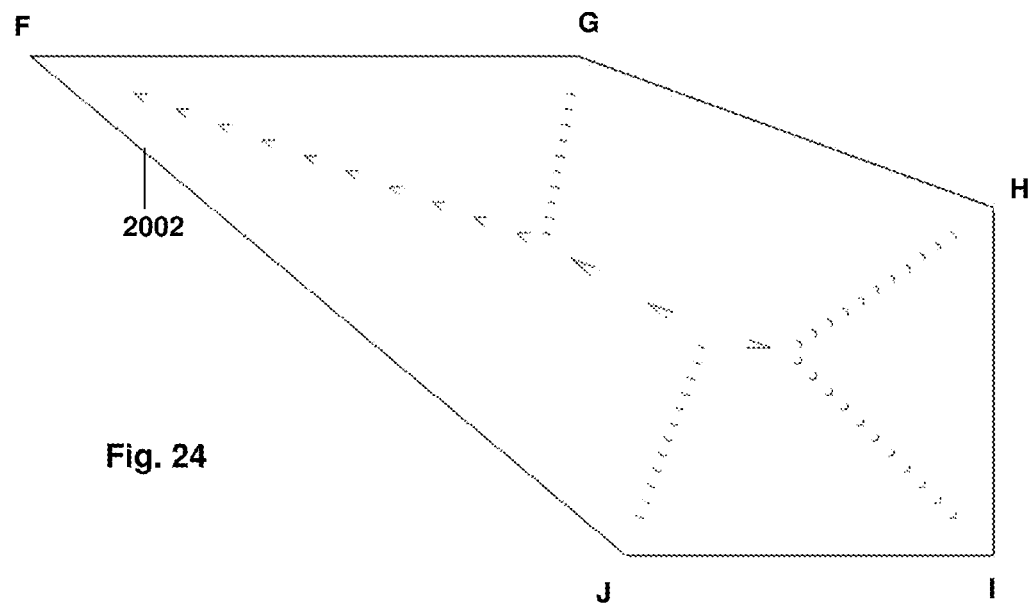
FIG. 24 shows a first stage in a further embodiment of the invention.

The initial step to locally optimize the number of segments in a subset is to be able and identify the separate convex corner regions of a given perimeter. FIG. 24 shows the $n^{th}$ cutting path 2002 on which portions of the entire set of initial offsets, as illustrated in relation to FIG. 18, have been highlighted to reflect each corner region F to J. Some embodiments may employ a Voronoï Diagram to generate the construction curves.

Other embodiments may achieve the same result using alternative offset methods. For instance an offset method arranged to keep references to the original spans from which it generates offsets could be used to identify corners on the construction curve.

The empirical rules may then be used as above to determine the number of cutting paths per subset in the region of each corner. Thus, in the region of corner F it can be seen that a single cutting path per subset has been determined (and as such each of the further initial offsets is used); in the region of corner G only the initial offset is required; in the region of corner H two further offsets are utilised; in the region of corner I six further offsets are required; and in the region of corner J one further offset is required. Thus, it will be seen that the number of offsets utilised per corner, in addition to the initial offset, differs according to the angle of the corner. These remaining offsets are illustrated on FIG. 25 in the region of the respective corners.

Thus, it will be seen that the method generates a set of offsets (e.g. the set 3008 in the region of corner F) from the nth cutting path for each corner region F-J of the model.

Figure 25:
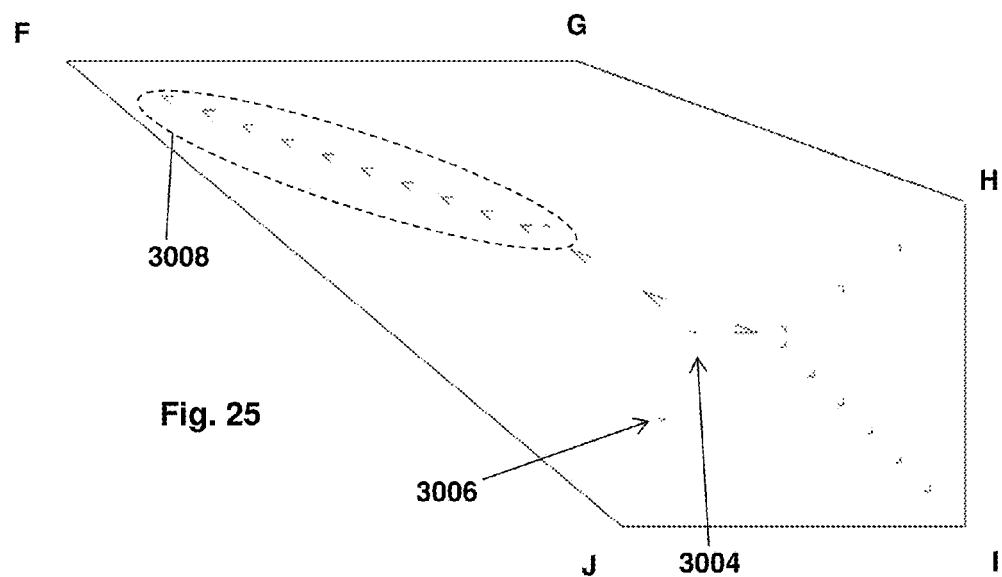
FIG. 25 shows a second stage in the embodiment of FIG. 24.
Figure 26:
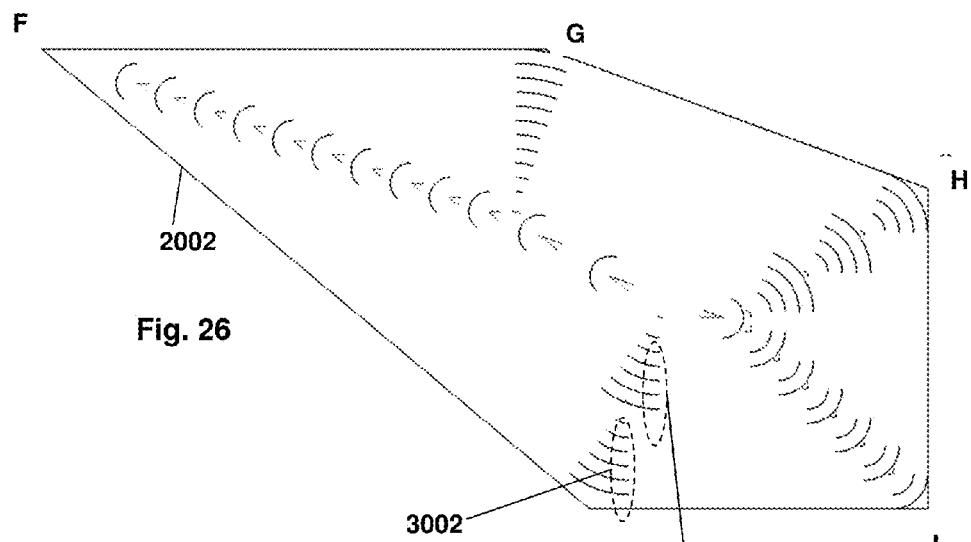
FIG. 26 shows a third stage in the embodiment of FIG. 24.

Once the number of further offsets per corner F to J has been determined as per FIG. 25 then these can be used to generate the cutting paths per subset as described in relation to FIG. 26. The embodiment being described performs this locally in relation to each of the corner regions F to J and as such, it can be seen that in the vicinity of each corner region there is developed one or more subsets of cutting paths. As such, it will be seen that the method determine whether the number of cutting paths within a subset should be varied around the or each cutting path and in the case of this embodiment, this determination is positive. As such, the method varies the number of cutting paths within a subset.

Accordingly, it will be seen that in the region of corner J there are six cutting paths per subset 3000, 3002. In the region of corner I there are two cutting paths per corner; in the region of corner H there are four cutting paths per subset; in the region of corner G there is ten cutting paths in the single subset; and in the region of corner F there is a single cutting path per subset.

For example, in the region of corner J there are generated two subsets of cutting paths 3000, 3002. The first of these subsets 3000 is generated from the initial offset 3004 and the second of the subsets 3002 is generated from the further offset 3006. The initial offset 3004 and the further offset 3006 are shown, for ease, on FIG. 25.

Next, the cutting paths generated as described in relation to FIG. 26 are joined to one another to form complete cutting paths that cause a material remover of a machine tool to move between corner regions F-J. The skilled person will appreciate that the generation of cutting paths and the joining of them may be performed simultaneously and is exemplified as two separate stages for ease of understanding.

Once the cutting paths have been joined, then the backfill cutting paths are added in order to remove material in-between the subsets of cutting paths (eg 2402, 2404).

Figure 27:
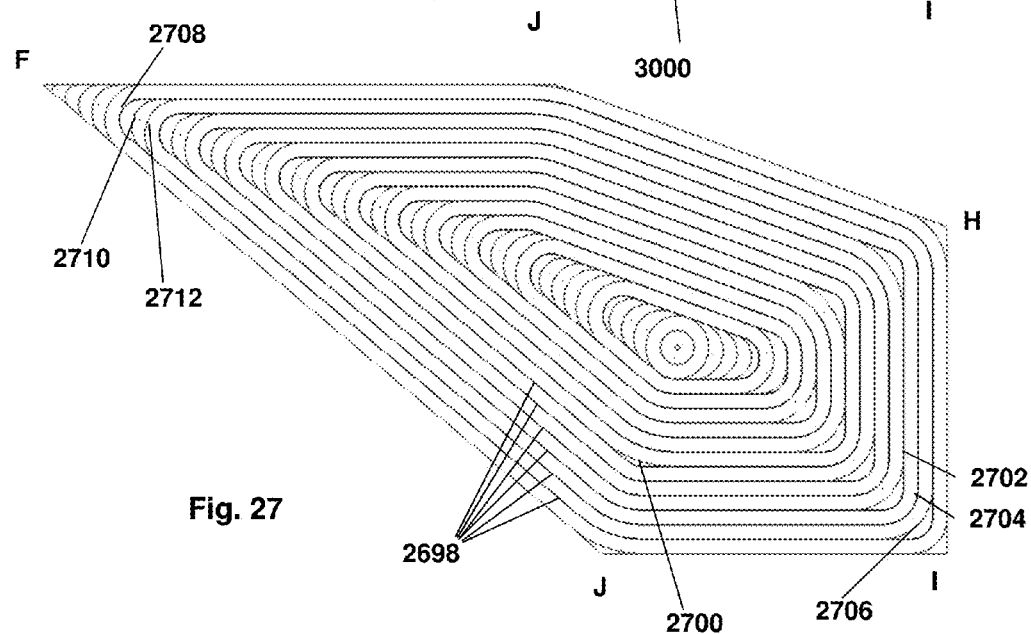
FIG. 27 shows a fourth stage in the embodiment of FIGS. 24; and 15
Figure 28:
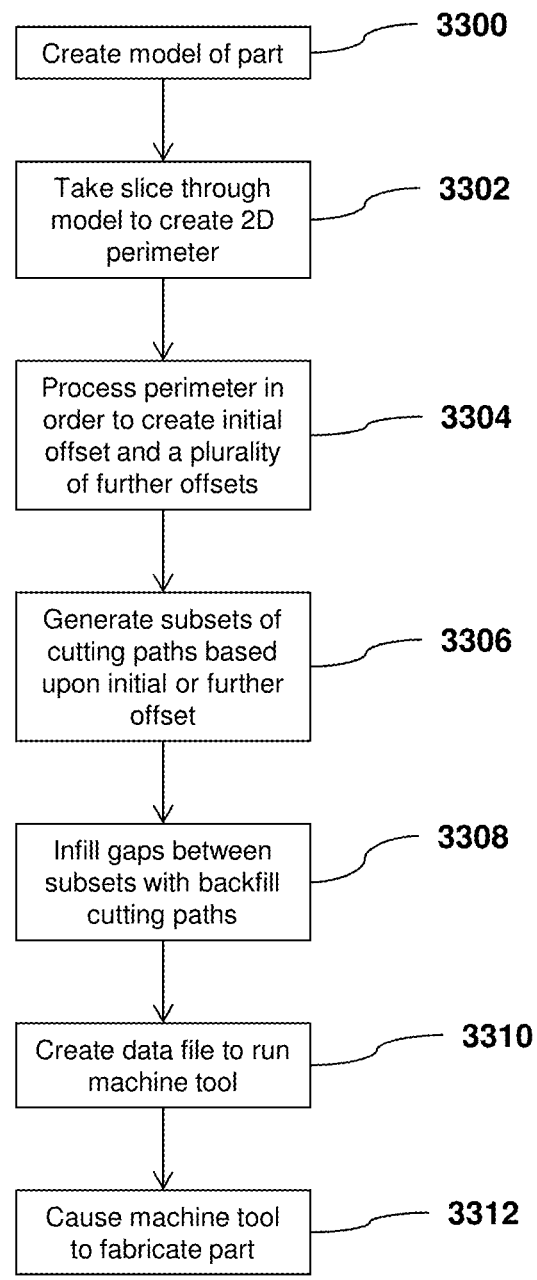
FIG. 28 shows a flow chart outlining one possible embodiment of the invention.

Again, in other embodiments, the backfill cutting paths may be generated as the method proceeds in the generation of the cutting paths. The completed set of cutting paths, including the subsets of cutting paths and the backfill cutting paths is shown in FIG. 27. It can be seen that the number of cutting paths per subset is varied according to the angle of the corner.

As such, looking at the cutting paths within the region of corner J, it can be seen that there are six cutting paths within a subset 2698 and that a single backfill cutting path 2700 is inserted between subsets. Looking at the subsets in the region of corner I, it can be seen that there are two cutting paths per subset 2702, 2704, with a single backfill 2706 cutting path inserted between subsets. Looking at the subsets within the region of corner F, it can be seen that there is a single cutting path 2708 per subset with two backfill passes 2710, 2712 inserted between subsets.

Thus, it will be seen that in this embodiment, the number of cutting paths within a subset are varied according to the angle of the corner. Also, the embodiment varies the number of backfill cutting paths between each subset.

Thus, it will be seen that the final cutting paths shown in FIG. 27 are different to those shown in FIG. 22 although the same $n^{th}$ cutting path 2002 has been cleared. However, in each case it will be seen that the set of cutting paths comprises a plurality of subsets of cutting paths in-between which there are a number of backfill cutting paths.

The invention claimed is:

1. A method of generating a plurality of cutting paths for a material remover of a machine tool arranged to have a stepover between the cutting paths, wherein the machine tool executes the cutting paths causing at least a portion of an article to be manufactured, the method comprising:
   a) assessing a model of the article to be manufactured and generating a set of offsets, based on the stepover, from the perimeter of the model for each corner region of the model;
   b) creating, for each of the offsets, a subset of the cutting paths based upon each offset with each cutting path within the subset being separated from a neighboring cutting path within the subset by substantially the stepover, wherein at least a portion of a first cutting path in one of the subsets has a stepover that is of greater distance than another stepover to the last cutting path in a previous subset;
   c) joining cutting paths from within a subset at each corner region to form complete cutting paths that cause a material remover of the machine tool to move between corner regions; and
   d) creating backfill cutting paths that are used to remove the material from between subsets of the cutting paths in the portion of the first cutting path in one of the subsets that has the stepover that is of greater distance than the other stepover to the last cutting path in a previous subset.

2. The method according to claim 1 in which further comprises fabricating an article designed by the method.

3. The method according to claim 1 in which an initial offset is created, in the corner regions, at a predetermined distance from the perimeter of the model of the article to be manufactured which comprises a predetermined multiple of the stepover distance and typically plus a multiple of a predetermined minimum cutting radius.

4. The method according to claim 1 which is arranged to perform a double offset, in which the offsets are created in a first direction from the perimeter of the model before a further offset is performed in a second direction.

5. The method according to claim 1 in which each subset of cutting path contains a predetermined number of cutting paths.

6. The method according to claim 1 in which the method varies the number of cutting paths within a subset according to an angle of a corner of the model.

7. The method according to claim 1 in which the method varies the number of backfill paths used between subsets of cutting paths and wherein the method may vary the number of backfill paths used according to the angle of a corner of the model.

8. The method according to claim 1 in which the method is arranged to set a minimum cutting radius and the method ensures that the cutting paths do not require the material remover to execute a curve, or curved portion of a cutting path, having a radius of less than the minimum cutting radius.

9. A non-transitory machine readable medium containing instructions, which, when executed by a machine, cause the machine to perform the method of claim 1.

10. A processing apparatus comprising processing circuitry arranged to generate a plurality of cutting paths for a material remover of a machine tool, wherein the machine tool executes the cutting paths causing at least a portion of an article to be manufactured, the processing circuitry further arranged to:
    a) assess a model of the article to be manufactured and generating a set of offsets based on a stepover from the perimeter of the article to be manufactured;
    b) create, for each of the offsets, a subset of the cutting paths based upon each offset with each cutting path within the subset being separated from a neighboring cutting path within the subset by substantially the stepover, wherein at least a portion of a first cutting path in one of the subsets has a stepover that is of greater distance than another stepover to the last cutting path in a previous subset;
    c) join cutting paths from within a subset at each corner region to form complete cutting paths that cause a material remover of the machine tool to move between corner regions; and
    d) create backfill cutting paths that are used to remove the material from between subsets of the cutting paths in the portion of the first cutting path in one of the subsets has a stepover that is of greater distance than the other stepover to the last cutting path in a previous subset.

11. The apparatus according to claim 10 in which the processing circuitry is arranged to create an initial offset, at each corner region, at a predetermined distance from the perimeter of the model of the article to be manufactured which comprises a predetermined multiple of the stepover distance.

12. The apparatus according to claim 11 in which the processing circuitry is also arranged to include a multiple of a predetermined minimum cutting radius in the initial offset.

13. The apparatus according to claim 10 in which the processing circuitry is arranged to perform a double offset, in which the offsets are created in a first direction from the perimeter of the model before a further offset is performed in a second direction, typically opposite the first direction.

14. The apparatus according to claim 10 in which the processing circuitry is arranged to generate each subset of cutting path such that they contain a predetermined number of cutting paths.

15. The apparatus according to claim 10 in which the processing circuitry is arranged to generate the subsets of cutting paths such that the number of cutting paths within a subset varies according to an angle of a corner of the cutting path.

16. The apparatus according to claim 10 in which the processing circuitry is arranged to set a minimum cutting radius such that the cutting paths do not require the material remover to execute a curve, or curved portion of a cutting path, having a radius of less than the minimum cutting radius.

17. A non-transitory machine readable medium containing instructions which when read by a machine cause that machine to:
    perform as the processing apparatus or the machine tool apparatus of claim 10.

18. A method of generating a plurality of cutting paths for a material remover of a machine tool, wherein the machine tool executes the cutting paths causing at least a portion of an article to be manufactured, the method comprising:
   a) generating the plurality of cutting paths comprising a plurality of subsets of cutting paths, wherein each of the plurality of subsets is generated based on a respective offset from a perimeter of the article to be manufactured, wherein the offset is based on a stepover, each cutting path within each subset is separated from a neighboring cutting path within the subset by substantially a predetermined stepover, wherein at least a portion of a first cutting path in one of the subsets has a stepover that is of greater distance than another stepover to a last cutting path in a previous subset;
   b) assessing curved portions of a current cutting path to be machined in the plurality of cutting paths to determine whether the angle of engagement between the material remover and the material to be machined is above a predetermined angle as the material remover passes around the current cutting path; and
   c) if the angle of engagement is predicted to fall above the predetermined angle then increasing the radius of a corresponding curved portion of a preceding cutting path such that the angle of engagement of the current cutting path remains below the predetermined angle.

19. The method according to claim 18 which comprises fabricating an article.

20. A non-transitory machine readable medium containing instructions which when read by a machine cause that machine to perform the method of claim 18.

21. The method according to claim 18 which repeats steps a and b, replacing the current path ($n^{th}$) in step a with the preceding path ($n-1^{th}$) in each iteration such that the preceding path ($n-1^{th}$) being assessed in step b becomes the path preceding the preceding path ($n-2^{th}$) of the previous iteration.

22. The method according to claim 18 in which the methods starts processing the plurality of cutting paths with the last one to be executed and works toward the first one to be executed.

23. The method according to claim 18 which increases the radius of curvature of portions of the preceding cutting path if is determined that the angle of engagement falls below the predetermined angle.

24. The method according to claim 18 which ensures that each of the cutting paths is tangent continuous.

25. The method according to claim 24 which is arranged to insert tangents to curved portions should it be determined that any one of the cutting paths is not tangent continuous.

26. A processing apparatus comprising processing circuitry arranged to generate a plurality of cutting paths for a material remover of a machine tool, wherein the machine tool executes the cutting paths causing at least a portion of an article to be manufactured, the processing circuitry further arranged to:
   a) generate the plurality of cutting paths comprising a plurality of subsets of cutting paths to be machined, wherein each of the plurality of subsets is generated based on a respective offset from a perimeter of the article to be manufactured, wherein the offset is based on a stepover, wherein each cutting path within each subset is separated from a neighboring cutting path within the subset by substantially a predetermined stepover, wherein at least a portion of a first cutting path in one of the subsets has a stepover that is of greater distance than another stepover to a last cutting path in a previous subset;
   b) assess curved portions of the plurality of cutting paths to determine whether the angle of engagement between a material remover of machine tool performing the cutting paths and the material to be machined is above a predetermined angle as the material remover passes around a current cutting path; and
   c) if the angle of engagement is predicted to fall above the predetermined angle then the processing circuitry being arranged to increase the radius of a corresponding curved portion of a preceding cutting path such that the angle of engagement of the current cutting path remains below the predetermined angle.

27. A non-transitory machine readable medium containing instructions which when read by a machine cause that machine to perform as the processing apparatus of claim 26.

* * * * *